United States Patent [19]

Ishikawa et al.

[11] Patent Number: 5,657,232
[45] Date of Patent: Aug. 12, 1997

[54] ONBOARD POSITIONING SYSTEM

[75] Inventors: Seiji Ishikawa, Kariya; Yuichi Murakami, Chiriyu; Tomio Yasuda, Kariya; Toshimitsu Oka, Okazaki, all of Japan

[73] Assignee: Aisin Seiki Kabushiki Kaisha, Kariya, Japan

[21] Appl. No.: 465,901

[22] Filed: Jun. 6, 1995

Related U.S. Application Data

[63] Continuation of Ser. No. 213,439, Mar. 15, 1994, abandoned.

[30] Foreign Application Priority Data

Mar. 17, 1993 [JP] Japan .................................. 5-057285
Mar. 17, 1993 [JP] Japan .................................. 5-057286

[51] Int. Cl.$^6$ .................................................. G06G 7/78
[52] U.S. Cl. ...................... 364/449.9; 364/449.7; 364/449.8; 364/459; 364/460; 340/995; 340/988; 342/357; 342/457; 342/358; 342/451
[58] Field of Search .................................. 364/443, 444, 364/459, 454, 460, 457, 57.05, 453, 449, 444.1–444.2, 449.1–449.95; 342/357, 457, 451, 461, 36, 44; 340/998, 995, 990, 988; 73/178 R

[56] References Cited

U.S. PATENT DOCUMENTS

| | | | |
|---|---|---|---|
| 3,702,477 | 11/1972 | Brown | 342/451 |
| 4,359,733 | 11/1982 | O'Neill | 364/449 |
| 4,405,986 | 9/1983 | Gray | 364/434 |
| 4,680,715 | 7/1987 | Pawelek | 364/449 |
| 4,731,613 | 3/1988 | Endo et al. | 342/357 |
| 4,918,609 | 4/1990 | Yamawaki | 364/449 |
| 5,075,693 | 12/1991 | McMillan et al. | 342/457 |
| 5,081,462 | 1/1992 | Tachita et al. | 342/352 |
| 5,101,356 | 3/1992 | Timothy et al. | 364/449 |
| 5,119,101 | 6/1992 | Barnard | 342/357 |
| 5,144,318 | 9/1992 | Kishi | 342/357 |
| 5,296,855 | 3/1994 | Matsuzaki et al. | 340/988 |
| 5,307,277 | 4/1994 | Hirano | 364/457 |
| 5,323,152 | 6/1994 | Morita | 340/988 |
| 5,390,124 | 2/1995 | Kyrtos | 364/449 |
| 5,402,340 | 3/1995 | White et al. | 364/454 |
| 5,430,657 | 7/1995 | Kyrtos | 364/459 |
| 5,469,158 | 11/1995 | Morita | 364/460 |
| 5,483,456 | 1/1996 | Kuwahara et al. | 364/449 |
| 5,493,294 | 2/1996 | Morita | 364/449 |

FOREIGN PATENT DOCUMENTS

| | | |
|---|---|---|
| 61-137009 | 6/1986 | Japan . |
| 61-167886 | 7/1986 | Japan . |

*Primary Examiner*—Jacques Louis-Jacques
*Attorney, Agent, or Firm*—Sughrue, Mion, Zinn, Macpeak & Seas

[57] ABSTRACT

A relative speed of a vehicle with respect to a satellite is detected from a deviation of a tuning frequency caused by the Doppler effect, and a vehicle speed is determined from the relative speed. A piezoelectric oscillation gyro detects an angular speed of rotation of the vehicle, which is integrated to determine an azimuth. A travel is detected in terms of the vehicle speed and the azimuth, and the detected travel and information from available GPS satellites are substituted into a navigation equation to solve it for a solution. Alternatively, altitude information detected by an altitude sensor and the angular speed of rotation of the vehicle as detected by the piezoelectric oscillation gyro may be is inputted. The angular speed of rotation is integrated to determine the azimuth. Information from two GPS satellites and information representing azimuth φ and altitude Δz are substituted into the navigation equation to solve it for a solution. Kalman filter is employed. Even when available GPS satellites is two or one, the determination of the position of the vehicle is enabled. The need for a vehicle speed sensor is eliminated, and the accuracy of positioning is enhanced.

10 Claims, 29 Drawing Sheets

Fig. 6

(determination of physical model matrix)

$$\vec{X}_{i+1} = C_i \vec{X}_i \qquad \vec{X}_i = \begin{pmatrix} \Delta x_i' \\ \Delta y_i' \\ \Delta z_i' \\ c\Delta t_i' \end{pmatrix}_i$$

physical model matrix:
$$C_i = \begin{pmatrix} Cx_i & 0 & 0 & 0 \\ 0 & Cy_i & 0 & 0 \\ 0 & 0 & 1 & 0 \\ 0 & 0 & 0 & 1 \end{pmatrix}$$

$$Cx_i = (\tfrac{1}{2} a'_{x_i} T^2 + v'_{x_i} T) / \Delta x_i'$$

$$Cy_i = (\tfrac{1}{2} a'_{y_i} T^2 + v'_{y_i} T) / \Delta y_i'$$

when proceeding from a solution of GPS independent positioning calculation:

$\vec{v}_i' = |\vec{v}_{GPS}| \cdot \vec{e}_G$  $\qquad \vec{e}_G$: unit vector pointing the azimuth of vehicle $\vec{a}_i' = (\vec{v}_i' - \vec{v}_{i-1}') / t$  $\qquad$ t: time interval between i-th and (i−1)-th positionings when proceeding from a solution of composite positioning calculation:

$\vec{v}_i' = |\vec{P}_i - \vec{P}_{i-1}| \cdot \vec{e}_G / t$ $\vec{a}_i' = (\vec{v}_i' - \vec{v}_{i-1}') / t$  $\qquad \vec{P}_i$: position vector to a point being positioned (return)

Fig. 7

```
( determination of measurement
       error estimation matrix )
              ↓
      <number of satellites=1?>  NO →
              ↓ YES
``` use this determinant
(number of satellites=1)

$$\Sigma_{E_{i+1}} = \begin{bmatrix} \sigma_0^2 & 0 & 0 & 0 \\ 0 & \sigma_x^2 & 0 & 0 \\ 0 & 0 & \sigma_y^2 & 0 \\ 0 & 0 & 0 & \sigma_z^2 \end{bmatrix}$$

use this determinant
(number of satellites=2)

$$\Sigma_{E_{i+1}} = \begin{bmatrix} \sigma_0^2 & 0 & 0 & 0 \\ 0 & \sigma_0^2 & 0 & 0 \\ 0 & 0 & \sigma_x^2 & 0 \\ 0 & 0 & 0 & \sigma_y^2 \end{bmatrix}$$

( return )

$\sigma_0 = UERE$ $\sigma_x = \sigma_v t \cdot \cos\psi'$ $\sigma_y = \sigma_v t \cdot \sin\psi'$ $\sigma_z^2$ : altitude error
(which is equal to $\sigma_0^2$ when attitude data is absent)

$t$ : time required for positioning of satellite $\sigma_v$ : error of satellite speed $\psi'$ : azimuth angle $\psi$ as converted to earth surface coordinate system ($=180-\psi$)

| SVACC | 0 | 1 | 2 | 3 | 4 | 5 | 6 | 7 | 8 ... |
|---|---|---|---|---|---|---|---|---|---|
| UERE(m) | 11.1 | 11.3 | 11.6 | 12.3 | 13.6 | 15.7 | 19.6 | 33.8 | 64.9 ... | formula for derivation of SVACC→UERE
  $N = SVACC$, $0 \leq N \leq 15$,
  $URA = 2^{(1+N/2)}$ $(0 \leq N < 7)$, $URA = 2^{(N-2)}$ $(7 \leq N \leq 14)$ $UERE = \sqrt{(URA)^2 + 119.7}$ URA: User Range Accuracy
UERE: User Equivalent Range Error
119.7: determined by system parameters of GPS

Fig. 8

```
determination of physical
     model error matrix
``` use this determinant
(number of satellites=1)

$$\Sigma_{U_i} = \begin{pmatrix} E_H^2 & 0 & 0 & 0 \\ 0 & E_H^2 & 0 & 0 \\ 0 & 0 & 0 & 0 \\ 0 & 0 & 0 & 0 \end{pmatrix}$$

return $E_H = V \times t$

V: amount of error per unit length of time t: time interval between positioning passes

Fig. 9 obtain a solution

S91  
solution of positioning (optimum estimate)

$$\hat{X}_{i+1} = \tilde{X}_{i+1} + \Sigma \tilde{X}_{i+1} A_{i+1}^T [\Sigma E_{i+1} + A_{i+1} \Sigma \tilde{X}_{i+1} A_{i+1}^T]^{-1}$$

$$\cdot (L_{i+1} - A_{i+1} \tilde{X}_{i+1})$$

estimated error covariance

$$\Sigma \hat{X}_{i+1} = \{[I - \Sigma \tilde{X}_{i+1} A_{i+1}^T [\Sigma E_{i+1} + A_{i+1} \Sigma \tilde{X}_{i+1} A_{i+1}^T]^{-1}$$

$$\cdot A_{i+1}] \Sigma \tilde{X}_{i+1}$$

return $$\tilde{X}_{i+1} = C_i \hat{X}_i$$

$$\Sigma \tilde{X}_{i+1} = C_i \Sigma \hat{X}_i C_i^T + \Sigma U_i$$

$$\Sigma \hat{X}_{i+1} = \begin{pmatrix} \sigma_x^2 & \sigma_{xy} & \sigma_{xz} & \sigma_{xt} \\ \sigma_{yx} & \sigma_y^2 & \sigma_{yz} & \sigma_{yt} \\ \sigma_{zx} & \sigma_{zy} & \sigma_z^2 & \sigma_{zt} \\ \sigma_{tx} & \sigma_{ty} & \sigma_{tz} & \sigma_t^2 \end{pmatrix}$$

expected error $= \sqrt{\sigma x^2 + \sigma y^2}$

Fig. 19

( sequential approximation )

S191: GPS azimuth data $\psi_{1GPS}, \psi_{2GPS}, \psi_{3GPS}$ obtained from three points are inputted S192:
$\theta c2 \leftarrow (\psi_{2GPS} - \psi_{1GPS})/T_{21}$
$\theta c3 \leftarrow (\psi_{3GPS} - \psi_{2GPS})/T_{32}$ S193: use the following relationship:
$$\begin{bmatrix} \theta g2 & 1 \\ \theta g3 & 1 \end{bmatrix} \begin{bmatrix} \alpha \\ \theta o' \end{bmatrix} = \begin{bmatrix} \theta c2 \\ \theta c3 \end{bmatrix}$$
$\theta g2$: gyro angle corresponding to $\theta c2$
$\theta g3$: gyro angle corresponding to $\theta c3$ S194: determine the measurement error estimation matrix
$$\Sigma^G_{E_{i+1}} = \begin{bmatrix} \sigma^2 fmax & 0 \\ 0 & \sigma^2 fmax \end{bmatrix}$$
$\sigma^2 fmax$: maximum square of GPS azimuth error of data used $A^G_{i+1} : \begin{bmatrix} \theta g_{i+1}^2 & 1 \\ \theta g_{i+1}^3 & 1 \end{bmatrix}$ $\vec{X}^G_{i+1} : \begin{bmatrix} \alpha_{i+1} \\ \theta o'_{i+1} \end{bmatrix}$ $L^G_{i+1} : \begin{bmatrix} \theta c_{i+1}^2 \\ \theta c_{i+1}^3 \end{bmatrix}$ $i$: ordinal number of sequential approximation S195: Is solution of previous pass valid?

NO → S196:
$i \leftarrow 1$
$\hat{X}^G_1 \leftarrow A^{G^{-1}}_1 L^G_1$
$\Sigma^G_{\hat{X}_1} = (A^{G^T}_1 \Sigma^{G^{-1}}_{E_1} A^G_1)^{-1}$ YES → S197: solve for a solution of sequential approximation
$\hat{X}^G_{i+1} = \hat{X}^G_i + \Sigma^G_{\hat{X}_i} A^{G^T}_{i+1} [\Sigma^G_{E_{i+1}} + A^G_{i+1} \Sigma^G_{\hat{X}_i} A^{G^T}_{i+1}]^{-1} (L^G_{i+1} - A^G_{i+1} \hat{X}^G_i)$
$\Sigma^G_{\hat{X}_{i+1}} = [\mathbb{I} - \Sigma^G_{\hat{X}_i} A^{G^T}_{i+1} [\Sigma^G_{E_{i+1}} + A^G_{i+1} \Sigma^G_{\hat{X}_i} A^{G^T}_{i+1}]^{-1} A^G_{i+1}] \Sigma^G_{\hat{X}_i}$ S198: valid flag set, $\theta g' \leftarrow \alpha_{i+1} \theta g + \theta o'_{i+1}$ ( return )

Fig. 28

(determination of measurement error estimation matrix)

$\sigma_o = $ UERE $\sigma^2_z$: altitude error (which is equal to $\sigma_o^2$ if altitude data is invalid)

use this equation $$\Sigma_{Ei+1} = \begin{pmatrix} \sigma_o^2 & 0 & 0 & 0 \\ 0 & \sigma_o^2 & 0 & 0 \\ 0 & 0 & \sigma_z^2 & 0 \\ 0 & 0 & 0 & \sigma_G^2 \end{pmatrix}$$

$\sigma_G = n \sigma_o \sin\theta_{error}$ n: the number of times of positioning ageinst two satellites $\theta_{error} = TA(\theta e \sqrt{\sigma_\alpha^2} + \sqrt{\sigma_{\theta 0}^2},)$ ; normally $\theta_{error} = TA(\theta e \sqrt{\sigma_\alpha^2} + \psi_{error}^{GPS})$ ; in the presence of zero $\omega$ correction $\Sigma_{\hat{X}i}^G = \begin{pmatrix} \sigma_\alpha^2 & * \\ * & \sigma_{\theta 0}^2 \end{pmatrix}$ ; error of gyro correction coefficient $\psi_{error}^{GPS}$ : error of GPS azimuth when the zero correction of angular speed is present TA: length of time during which no gyro correction takes place $\theta e$: constant

| SVACC   | 0    | 1    | 2    | 3    | 4    | 5    | 6    | 7    | 8 · · · · |
|---------|------|------|------|------|------|------|------|------|-----------|
| UERE(m) | 11.1 | 11.3 | 11.6 | 12.3 | 13.6 | 15.7 | 19.6 | 33.8 | 64.9 · · ·| formula for derivation of SVACC→UERE

N=SVACC, $0 \leq N \leq 15$,

URA=$2^{(1+N/2)}$ ($0 \leq N < 7$), URA=$2^{(N-2)}$ ($7 \leq N \leq 14$)

UERE=$\sqrt{(URA)^2 + 119.7}$

URA: User Range Accuracy
UERE: User Equivalent Range Error
119.7: determined by system parameters of GPS (return)

ONBOARD POSITIONING SYSTEM

This is a Continuation of application Ser. No. 08/213,439 filed Mar. 15, 1994 now abandoned.

BACKGROUND OF THE INVENTION

The invention relates to an onboard positioning system, in particular, to an onboard positioning system which is used to provide an onboard determination of the position of a vehicle by utilizing radio waves from a positioning satellite such as GPS (Global Positioning System).

A technology for a positioning system for use on a vehicle while utilizing GPS is previously proposed, and is implemented in some form, as disclosed in Japanese Laid-Open Patent Applications No. 157,009/1986 and 167,886/1986, for example.

GPS satellite transmits a radio wave directed to the earth at a given timing which is modulated by data representing an exact timing, an orbital function and the accuracy of information. The location of the satellite can be determined from the timing and the orbital function while a difference between the satellite timing and the time at the point where the wave is received, which indicates a delay time required for the transmission of the wave, may be used to determine the distance from the satellite to the point of reception. If the positions of three different satellites and the distances from these satellites to the point of reception are known, the position of the point of reception in three dimensional space, which is unknown, can be determined by solving ternary simultaneous equations. However, the time at the point of reception normally contains an error of a relatively large magnitude, which must be compensated for by utilizing information from four satellites simultaneously. If it is assumed that the altitude of the point of reception remains substantially unchanged, it is also possible to determine the position of the point of reception in two dimensions such as latitude and longitude or around the surface of the earth from information obtained from three satellites.

However, the number of available GPS satellites is limited in actuality, and in addition, a vehicle may frequently stay or pass positions where the radio wave is shielded, as when entering a tunnel or running behind a building. Accordingly, a difficulty is experienced in maintaining the reception of radio waves from three or four satellites at all times. It then follows that the determination of the position by utilizing radio waves from the satellites is inhibited, unless information from three or more satellites are available simultaneously.

In Japanese Laid-Open Patent Application No. 137,009/1986, there is disclosed a technique in which an optical fiber gyro is used to detect a change in the azimuth or orientation of a vehicle while a vehicle speed sensor is used to determine a distance travelled by the vehicle to enable the detection of the position of the vehicle from the reception of a radio wave even from a single satellite through an auxiliary use of information detected in this manner. Japanese Laid-Open Patent Application No. 167,886/1986 discloses a technique in which the detection of the position of the vehicle is enabled from the reception of radio waves from two satellites through an auxiliary use of a magnetic azimuth instrument and a distance meter which are mounted onboard.

Japanese Laid-Open Patent Application No. 137,009/1986 determines the position in terms of the latitude and the longitude, basically assuming that the vehicle assumes a constant altitude, and also suggests that the altitude can be determined by utilizing an altimeter.

In the prior art described above, where the number of available satellites is insufficient, the distance travelled by the vehicle is determined from a signal delivered by a vehicle speed sensor to compensate for any wanting information. However, the vehicle speed sensor must be mounted at a given location adjacent to a wheel, which involves difficulty in mounting, and hence is undesirable to use.

SUMMARY OF THE INVENTION

Accordingly, it is a task of the invention to enable the determination of the position of a vehicle when the number of available satellites is equal to two or less by compensating for any wanting information while avoiding the use of a vehicle speed sensor, and to minimize an error in detecting such position.

In order to enable the determination of the position of a vehicle if the number of available satellites is one or two, in accordance with the invention, there is provided an onboard positioning system which determines the position of a vehicle on the basis of information received onboard the vehicle and representing the timing and orbit which are transmitted from a plurality of satellites, comprising gyro means for delivering a signal which depends on an angular speed of rotation of a vehicle; means (106) for detecting a relative speed between the satellite and the vehicle in accordance with the frequency ($f_0$) of a signal transmitted by the satellite and the frequency (f) of a signal actually received; and information processing means for calculating the position of the vehicle on the basis of information transmitted from the available satellites, the angular speed of rotation of the vehicle which is delivered by the gyro means and the relative speed Which is delivered by the detecting means when the number of simultaneously available satellites is insufficient.

In a preferred embodiment, the information processing means includes means for determining a reference azimuth representing an orientation in which the vehicle proceeds, from the azimuth which is determined on the basis of information transmitted from the satellites when the number of simultaneously available satellites is sufficient, and for determining the orientation in which the vehicle proceeds on the basis of the angular speed of rotation of the vehicle delivered from the gyro means and the reference azimuth.

In a more preferred embodiment, the information processing means includes means for calculating the position of the vehicle from a solution of predetermined Kalman filter formula when the number of simultaneously available satellites is insufficient.

In accordance with the invention, where the number of simultaneously available satellites is insufficient, the position of the vehicle is calculated on the basis of information transmitted from available satellites, the angular speed of rotation of the vehicle which is delivered from the gyro means, and the relative speed which is output from the detecting means.

The relative speed is obtained from the frequency $f_0$ of a signal transmitted by a satellite and the frequency f of a signal which is actually received. Specifically, while the frequency $f_0$ (nominal value) of a radio wave which is actually transmitted from a satellite remains constant, the frequency f of the radio wave which reaches the vehicle on the earth varies in accordance with the relative speed between the satellite and the vehicle as a result of Doppler effect. Thus, by detecting the frequency f, the relative speed (Vr) may be obtained on the basis of f and $f_0$.

A vector representing a travelling speed v of a vehicle is obtained from a vector representing a relative speed Vr between a satellite and a vehicle as well as vectors representing Vs, es and eg, according to a formula shown at step S227 in FIG. 22 where Vs represents a speed vector of the satellite which is determined by differentiating orbital information of the satellite, es represents a direction cosine of the orientation of the satellite as viewed from the vehicle which can be determined from the position of the satellite and the expected position of the vehicle, and eg represents an azimuth vector indicating the orientation in which the vehicle proceeds and which can be determined from a reference azimuth $\phi$ref at a given time and the amount of rotation of the vehicle which occurs subsequent to the given time. The amount of rotation $\Delta\phi$g of the vehicle is obtained by integrating the angular speed $\omega$ of rotation which is delivered from the gyro means.

Speed components vx, vy along individual axes can be obtained from the vector representing the travelling speed v of the vehicle, and the travels of the vehicle along the individual axes $\delta$x and $\delta$y can be obtained from vx, vy and the time increment $\delta$t. By utilizing these parameters $\delta$x' and $\delta$y', it is possible to determine the position of the vehicle at that time according to the navigation equation shown in FIG. 5, for example, if only one satellite is available at a given point in time.

Where the number of simultaneously available satellites is less than three, there is a likelihood that the parameters which are used in the calculation of the position of the vehicle contain an error of a relatively large magnitude, and the error increases in magnitude as the time passes. To accommodate for this, in an embodiment to be described later, the error which arises is prevented from increasing in magnitude by calculating the position of the vehicle as a solution (see FIG. 9) of a formula for a predetermined optimum filter, commonly referred to as Kalman filter.

According to another feature of the invention, in order to enable the determination of the position of a vehicle when the number of available satellites is two, there is provided an onboard positioning system which determines the position of a vehicle on the basis of information received onboard and relating to the timing and orbit and which is transmitted from a plurality of satellites, comprising gyro means delivering a signal which depends on an angular speed of rotation of a vehicle; altitude detecting means for delivering altitude information of the position of the vehicle which is detected or determined by an estimation; and information processing means for calculating the position of the vehicle on the basis of information from the available satellites, the angular speed of rotation of the vehicle which is delivered from the gyro means and altitude information from the altitude detecting means in the event the number of simultaneously available satellites is insufficient.

In a preferred embodiment, this onboard positioning system further comprises:

means for determining a reference azimuth ($\phi$ref) representing an orientation in which the vehicle proceeds on the basis of an azimuth which is determined from satellite information obtained when the number of simultaneously available satellites is sufficient and for determining the orientation in which the vehicle proceeds on the basis of the angular speed ($\omega$) of rotation of the vehicle which is delivered from the gyro means and the reference azimuth whenever the number of available satellites is insufficient;

means for determining a reference azimuth representing an orientation in which the own vehicle proceeds on the basis of an azimuth determined from satellite information obtained when the number of simultaneously available satellites is sufficient, for sequentially updating the reference azimuth on the basis of latest satellite information and for inhibiting the updating of the reference azimuth when the speed of the vehicle is equal to or less than a given value;

means for correcting altitude information from the altitude detecting means on the basis of position information determined from satellite information obtained when the number of simultaneously available satellites is sufficient;

means for calculating the position of vehicle by obtaining a solution (S91) of a predetermined formula for Kalman filter when the number of simultaneously available satellites is insufficient;

and means for determining a reference azimuth representing an orientation in which the vehicle proceeds on the basis of an azimuth determined from satellite information obtained when the number of simultaneously available satellites is sufficient, for sequentially updating the reference azimuth on the basis of latest satellite information, and for inhibiting the updating of the reference azimuth whenever a change in the azimuth detected is equal to or greater than a given value.

In accordance with the invention, when the number of simultaneously available satellites is insufficient, the position of a vehicle is calculated on the basis of information from available satellites, the angular speed of rotation of the vehicle which is delivered by the gyro means, and altitude information which is delivered from the altitude detecting means.

When the number of simultaneously available satellites is equal to two, by solving a navigation equation (S252) shown in FIG. 27, travels $\Delta$x, $\Delta$y and $\Delta$z along individual axes of the vehicle as well as a clock error $\Delta$t, all of which are unknown, can be determined. In this equation, c represents speed of light, and $l'_1$, $m'_1$, $n'_1$, as well as $l'_2$, $m'_2$, $n'_2$ are direction cosines in the three dimensional space when a first and a second satellite is viewed from the vehicle, which can be determined on the basis of information transmitted from the respective satellites. $\Delta l_1$ and $\Delta l_2$ represent differences of equivalent range with respect to the first and the second satellite, namely, variations in the distance between the vehicle and the respective satellites. The distance between the vehicle and each satellite is determined from the predicted position of the vehicle and the position of the respective satellite. Finally, Gx=cos $\phi$, Gy=sin $\phi$. A change in the azimuth $\phi$ which represents an orientation in which the vehicle proceeds is obtained by integrating the angular speed $\omega$ of rotation of the vehicle which is delivered from the gyro means. In addition, a change in the altitude $\delta$z is obtained by the altitude detecting means. When the position of the vehicle at a given time is known, the current position of the vehicle can be obtained from the travels $\Delta$x, $\Delta$y and $\Delta$z along the individual axes from that position.

When the number of simultaneously available satellites is equal to four or greater, an exact azimuth can be determined only on the basis of satellite information. By utilizing the azimuth which is determined at this time, the reference azimuth $\phi$ref may be calibrated so that the orientation in which the vehicle proceeds may be subsequently determined on the basis of the angular speed of the vehicle which is delivered from gyro means as well as the reference azimuth when the number of available satellites is insufficient.

However, it is to be noted that an error in the azimuth which is determined on the basis of satellite information increases in magnitude when the vehicle is running at a low speed. Accordingly, whenever the running speed of the vehicle is equal to or less than a given value, the updating of the reference azimuth is inhibited, thus minimizing an increase in the magnitude of an error in the reference azimuth.

When the number of simultaneously available satellites is four or greater, an exact altitude can be determined only on the basis of satellite information. Accordingly, the exact altitude obtained in this manner may be used to correct altitude information contained in the altitude detecting means, thus reducing an error in the altitude detected.

Where the number of simultaneously available satellites is equal to three or less, there is a likelihood that the parameters as estimated which are used in the calculation of the position of the vehicle may include an error of a relatively large magnitude, and such error increases as the time passes. Accordingly, in an embodiment to be described later, an error which arises is prevented from increasing in magnitude by calculating the position of the vehicle as a solution (S91) of a formula for a predetermined optimum filter commonly referred to as Kalman filter.

It is to be understood that when such filter is used, the filter causes a lag in the response. For example, when the vehicle is continuously changing its orientation as when proceeding along a curve, the azimuth which appears at the output of the filter follows such change in lagging relationship with respect to the actual azimuth, and accordingly, the azimuth determined on the basis of satellite information at this time is not accurate. Accordingly, whenever a change in the azimuth detected is equal to or greater than a given magnitude, the updating of the reference azimuth is inhibited (S135, S145, S155) to prevent the error in the azimuth generated from increasing in magnitude, even though the number of simultaneously available satellites is sufficient.

BRIEF DESCRIPTION OF THE DRAWINGS

FIG. 6 is a flow chart showing a step S43 shown in FIG. 4 in detail;

FIG. 7 is a flow chart showing a step S44 shown in FIG. 4 in detail;

FIG. 8 is a flow chart showing a step S45 shown in FIG. 4 in detail;

FIG. 9 is a flow chart of part of a step S49 shown in FIG. 4 in detail;

FIG. 19 is a flow chart showing a sequential approximation in detail;

FIG. 28 is a flow chart showing a step S44 according to the second embodiment in detail.

DETAILED DESCRIPTION OF PREFERRED EMBODIMENTS

Figure 1:
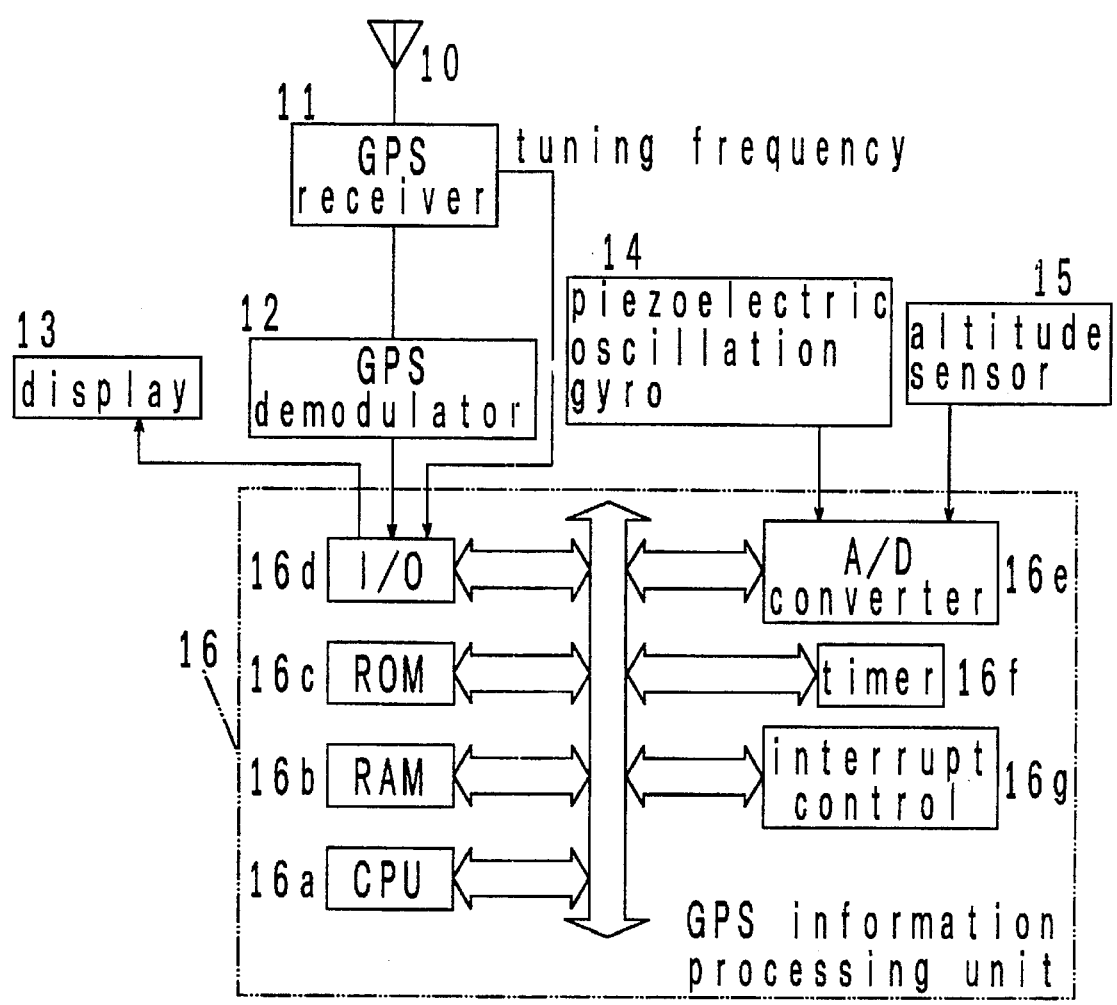
FIG. 1 is a block diagram of an overall system according to a first embodiment of the invention.

An overall arrangement of a system according to a first embodiment of the invention is shown in FIG. 1.

Referring to FIG. 1, the system is mounted onboard a road vehicle, and includes a receiving antenna 10, GPS receiver 11, GPS demodulator 12, a display 13, a piezoelectric oscillation gyro 14, an altitude sensor 15 and GPS information processing unit 16. Each satellite in the global positioning system transmits a radio wave at a frequency of 1.57542 GHz, which is received through the antenna 10 by the receiver 11, and the demodulator 12 demodulates information modulating the radio wave, namely, a code representing an orbital function of the satellite and the time of the satellite and the accuracy of information for input to GPS information processing unit 16. Basically, the unit 16 operates to produce information representing the position of a vehicle (latitude, longitude and altitude) on the basis of information transmitted from the satellite, and such information is delivered to the display 13. A fundamental arrangement including the receiving antenna 10, GPS receiver 11, GPS demodulator 12 and display 13 as well as a fundamental operation of GPS information processing unit 16 are similar to those of corresponding elements used in known systems which are commercially available.

When radio waves transmitted from four GPS satellites can be received simultaneously, the position of a vehicle can be accurately determined by utilizing only information conveyed by the radio waves in the calculation. However, where the number of available GPS satellites is insufficient, such calculation of the position of the vehicle is normally prohibited. In order to enable the calculation of the position of the vehicle even when the number of GPS satellites is insufficient, the present embodiment has a special provision of the piezoelectric oscillation gyro 14 and the altitude sensor 15, both of which feed signals to GPS information processing unit 16. In the present example, information representing the tuning frequency of the GPS receiver 11 is also input to the processing unit 16. The piezoelectric oscillation gyro 14 is fixedly mounted onboard, and produces an analog signal having a level which is proportional to the magnitude of an angular speed of rotation ω about an axis, which is a vertical axis of the vehicle. The altitude sensor 15 produces an analog signal having a level which varies with a change in the atmospheric pressure or a change in the altitude.

The information processing unit 16 is a computer system including CPU (microprocessor) 16a, RAM 16b, ROM 16c, I/O port 16d, A/D converter 16e, timer 16f and an interrupt control circuit 16g. Since the piezoelectric oscillation gyro 14 and the altitude sensor 15 produce analog signals as outputs, they are fed to CPU 16a through the A/D converter 16e. Information which is output from the GPS demodulator 12 as well as the tuning frequency are fed as a digital signal, which is thus input to CPU 16a through the I/O port 16d. Position information (including latitude, longitude and altitude) which are generated by CPU 16a is transferred to the display 13 through the I/O port 16d.

Figure 2:
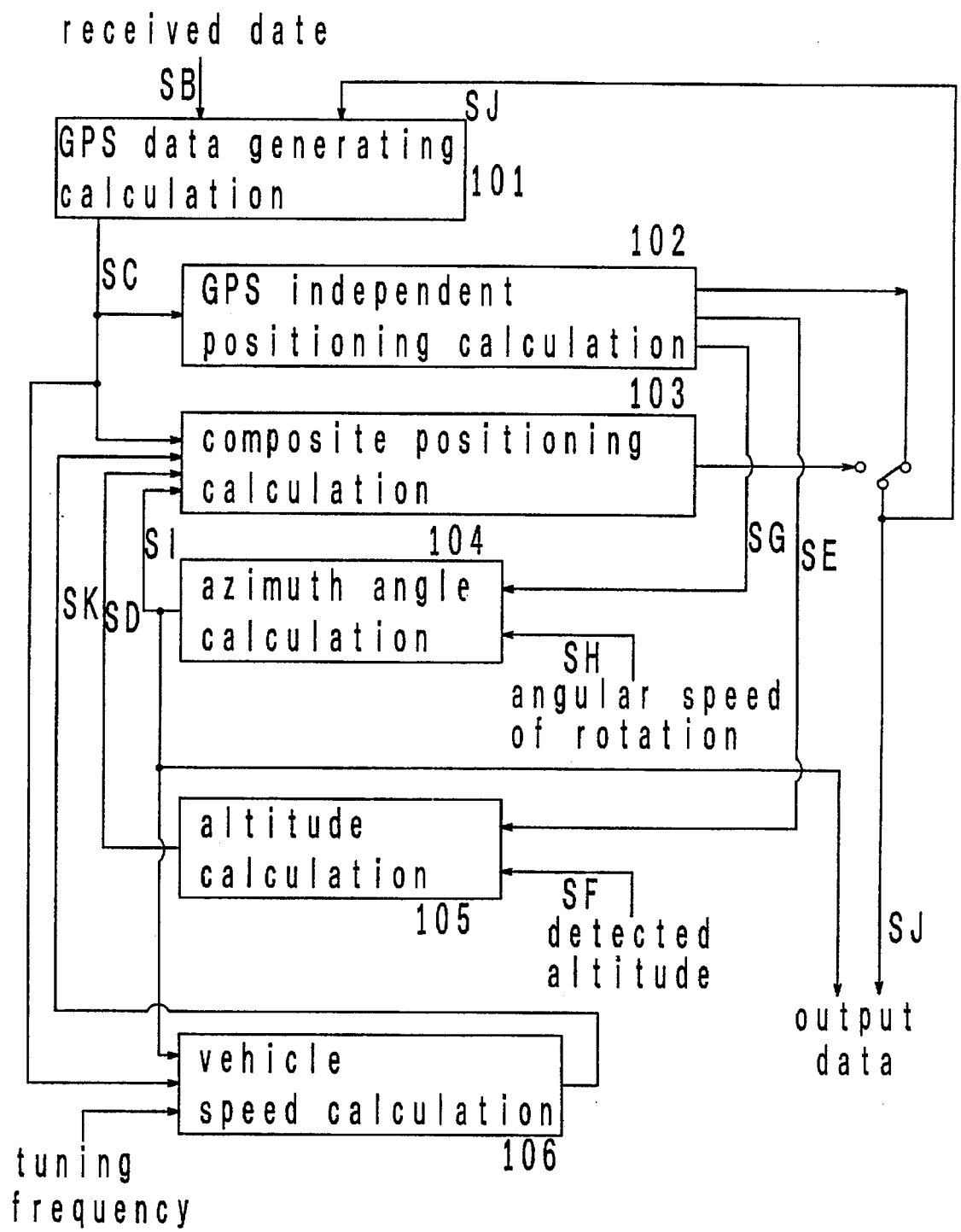
FIG. 2 is a block diagram representing a functional arrangement of a unit 16 shown in FIG. 1.

The functional arrangement of the GPS information processing unit 16 is schematically shown in FIG. 2. Referring to FIG. 2, reception data SB which is output from GPS demodulator 2, namely, codes indicating an orbital function and time of each satellite as well as the accuracy of information are input to a GPS data generating calculation 101. In the calculation 101, data SC is generated from reception data SB, and is then input to GPS independent positioning calculation 102, composite positioning calculation 103 and vehicle speed calculation 106. Whenever information from three or four or more GPS satellites can be simultaneously received, position information (latitude, longitude and altitude) SJ is generated as a result of the execution of GPS independent positioning calculation 102. However, when the number of available satellites is insufficient, position information (latitude, longitude and altitude) SJ is generated as a result of the execution of the composite positioning calculation 103. The position information generated is transferred to the display 13 as output data. The position information SJ is also fed back to the GPS data generating calculation 101 for use in the next succeeding calculation.

In the composite positioning calculation 103, output data SI from an azimuth calculation 104, output data SD from an altitude calculation 105 and output data SK from the vehicle speed calculation 106 are used, in addition to the data SC which is delivered from the GPS data generating calculation 101, to perform the calculation. In the azimuth calculation 104, an azimuth angle SI representing an orientation in which the vehicle proceeds is determined on the basis of angular speed of rotation data SH which is delivered by the piezoelectric oscillation gyro 14. In the azimuth calculation 104, a correction of the azimuth angle is also executed by utilizing azimuth data SG which is obtained as a result of the GPS independent positioning calculation 102. In the altitude calculation 105, a necessary altitude information SD is generated from detected altitude data SF obtained by the altitude sensor 15 and altitude data SE which is obtained as a result of the GPS independent positioning calculation 102. In the vehicle speed calculation 106, the running speed of the vehicle is calculated on the basis of information representing the tuning frequency of GPS receiver 11 and data SC as well as azimuth angle data SI, and result SK of such calculation is output to the composite positioning calculation 103.

Figure 3:
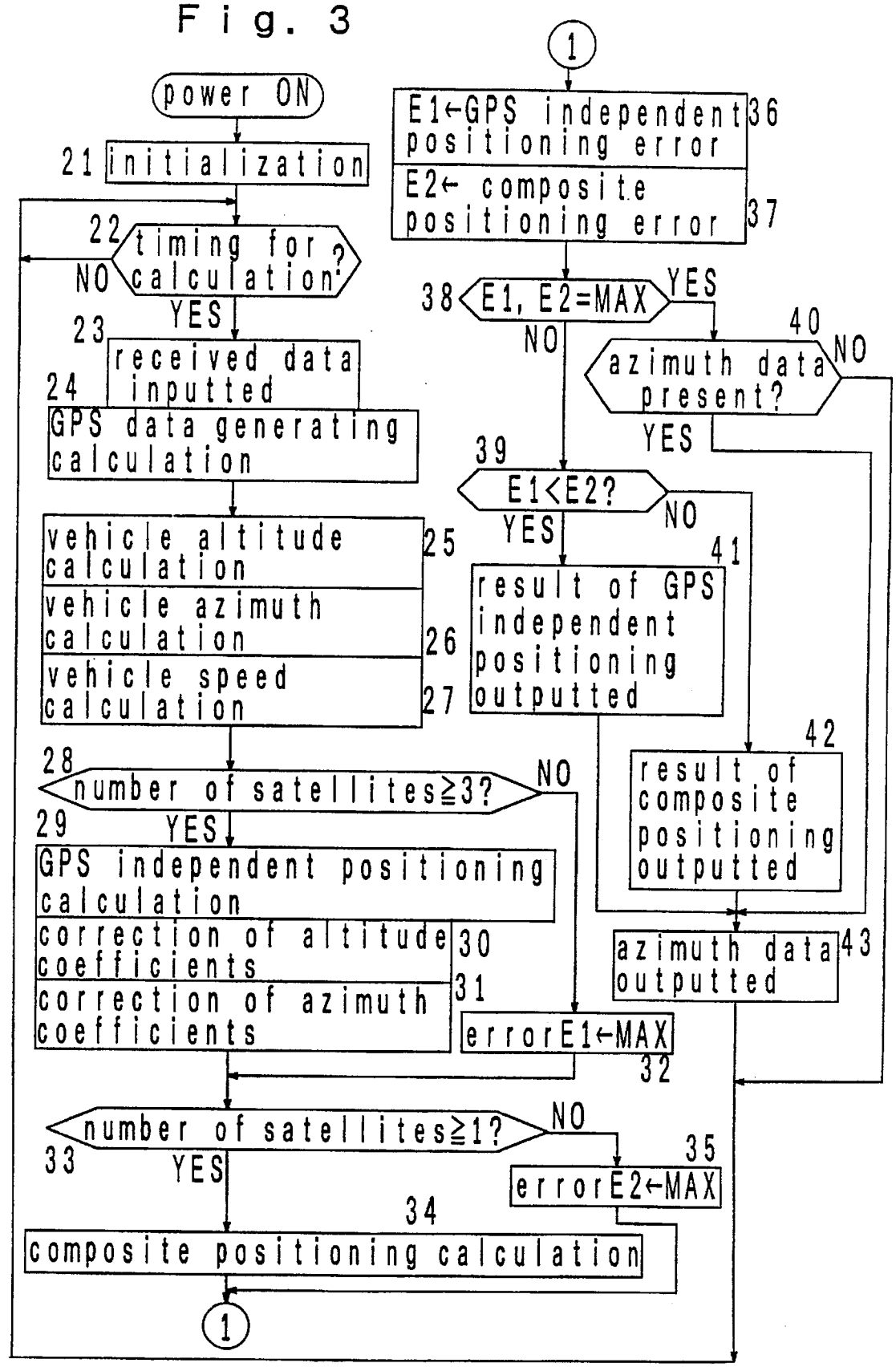
FIG. 3 is a flow chart illustrating the operation of CPU shown in FIG. 1.

FIG. 3 schematically shows the operation of CPU 16a of the GPS information processing unit 16. The operation of CPU 16a will now be described with reference to FIG. 3. When the power supply is turned on, an initialization is executed at step 21. Specifically, output ports as well as memories are cleared, various parameters are initialized, and an operating mode for the interrupt operation and a timer are preset. Upon completion of the step 21, the operation or program proceeds from step 22 to step 23 at a given timing for execution of subsequent operations.

At step 23, latest reception data SB is input. At next step 24, the GPS data generating calculation (corresponding to 101 shown in FIG. 2) is executed on the basis of the reception data SB. At a following step 25, the altitude of the own vehicle which then prevails is obtained, and the orientation in which the vehicle proceeds (azimuth) is determined at step 26, and the vehicle speed is determined at next step 27.

If signals from three or more satellites can be simultaneously received, the program proceeds from step 28 to step 29, and proceeds from step 28 to 32 otherwise, that is, when the number of available satellites is equal to two or less. At step 29, the GPS independent positioning calculation (corresponding to 102 shown in FIG. 2) is executed. At next step 30, various parameters which are used when obtaining the altitude (ST) during the calculation at step 25 are corrected by utilizing the result of calculation obtained at step 29. At subsequent step 31, various parameters used in obtaining the azimuth angle (SI) during the calculation at step 26 are corrected by utilizing the result of calculation performed at step 29. When the number of available satellites is equal to two or less, a maximum value is stored in an error register E1 at step 32.

At step 33, an examination is made to see if a signal from one or more satellites can be received, and if the signal can be received, the program proceeds to step 34 where the composite positioning calculation (corresponding to 103 shown in FIG. 2) is executed. If there is no available satellite as when the vehicle is running through a tunnel, for example, the program proceeds to step 35 where a maximum value is stored in an error register E2.

At step 36, an error which is detected during the execution of the GPS independent positioning calculation at step 29 is stored in the register E1, and at step an error which is detected during the execution of the composite positioning calculation at step 34 is stored in the register E2. At subsequent step 38, an examination is made to see if the registers E1 and E2 both contain the maximum value, and depending on the result of examination, the program proceeds to either step 39 or 40. At step 39, the content of the registers E1 and E2 are compared against each other, and if it is found that E1<E2, meaning that the error during the GPS independent positioning calculation is less than the error during the composite positioning calculation, the program proceeds to step 41 where the result of GPS independent positioning calculation (step 29) is output as position information SJ. If it is found at step 39 that E1<E2 does not apply, the result of the composite positioning calculation (step 34) is output as position information SJ. The output data SJ is also fed back for use in the calculation of the next pass.

At step 43, the azimuth angle data (SI) obtained at step 26 is output to the display 13. When there is effective azimuth angle data even though there is no available satellite, the program proceeds from step 38 to step 40 and thence to step 43, whereby the azimuth data is output to the display.

The described operation is repeatedly executed. In the present embodiment, the calculation of the position information takes place with a period of one second. However, a sampling of an output signal from the piezoelectric oscillation gyro as well as a related calculation, a sampling of an output signal from the altitude sensor and a sampling of the tuning frequency are repeatedly executed at a relatively short time period through respective timer interrupts. For example, the output signal from the piezoelectric oscillation gyro is sampled every 20 msec.

In this embodiment, the GPS independent positioning calculation (step 29) is executed and the composite positioning calculation (step 34) are also executed even when there are three or more available satellites. Normally, an accurate position of the own vehicle can be determined by the GPS independent positioning calculation, but in the event information which is transmitted from one of three GPS satellites, for example, exhibits a low accuracy, an error of a large magnitude may be produced in the result of GPS independent positioning calculation. Accordingly, errors which are contained in the results of two different calculations are compared against each other, and the result of calculation with a lesser magnitude of error is used, thus preventing the detected error from increasing in magnitude. The accuracy of information transmitted by GPS satellite can be recognized in terms of accuracy code SVACC which is contained in the information being transmitted. However, when three or more satellites are available, the execution of the composite positioning calculation may be omitted.

Figure 4:
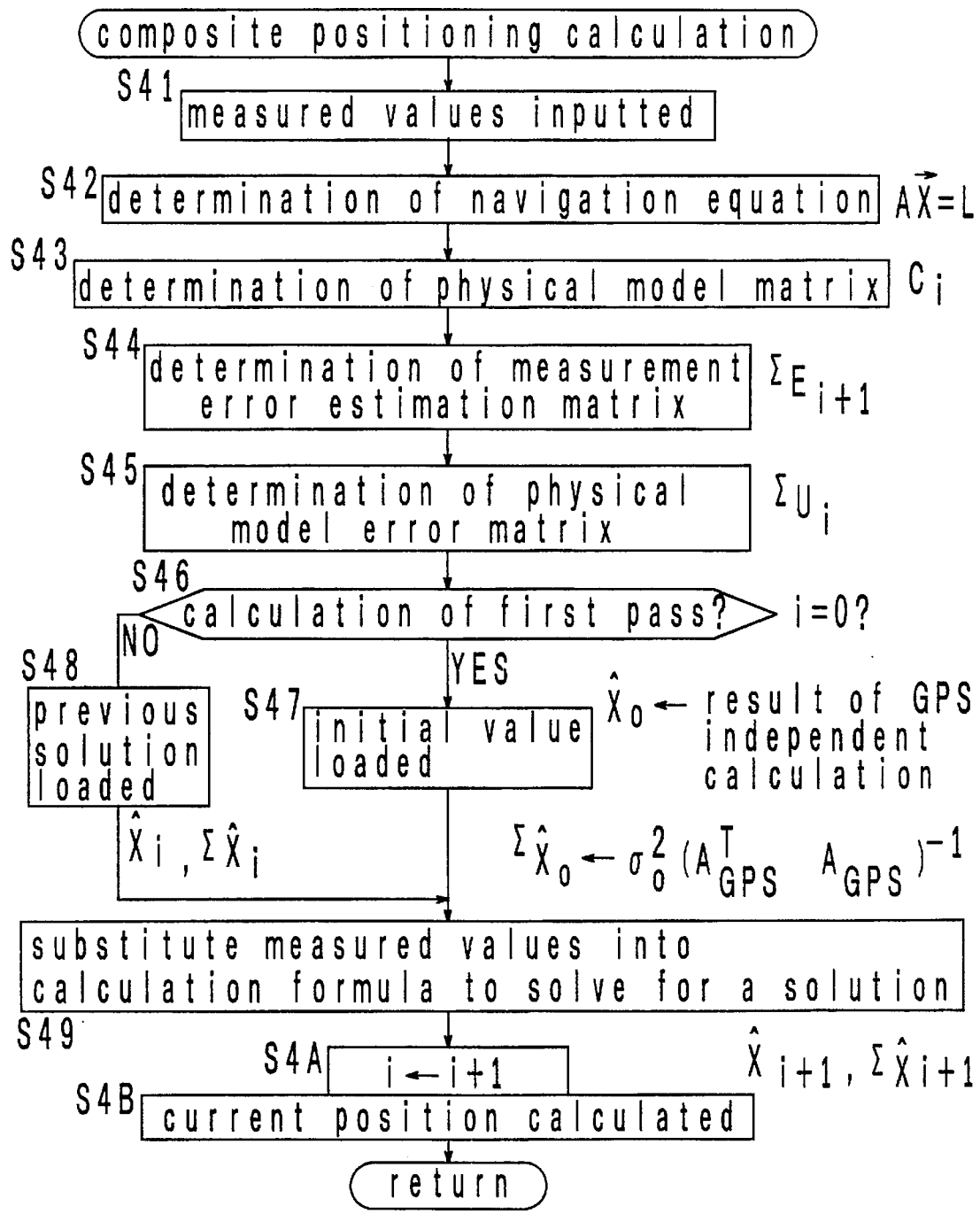
FIG. 4 is a flow chart for a composite positioning calculation.
Figure 5:
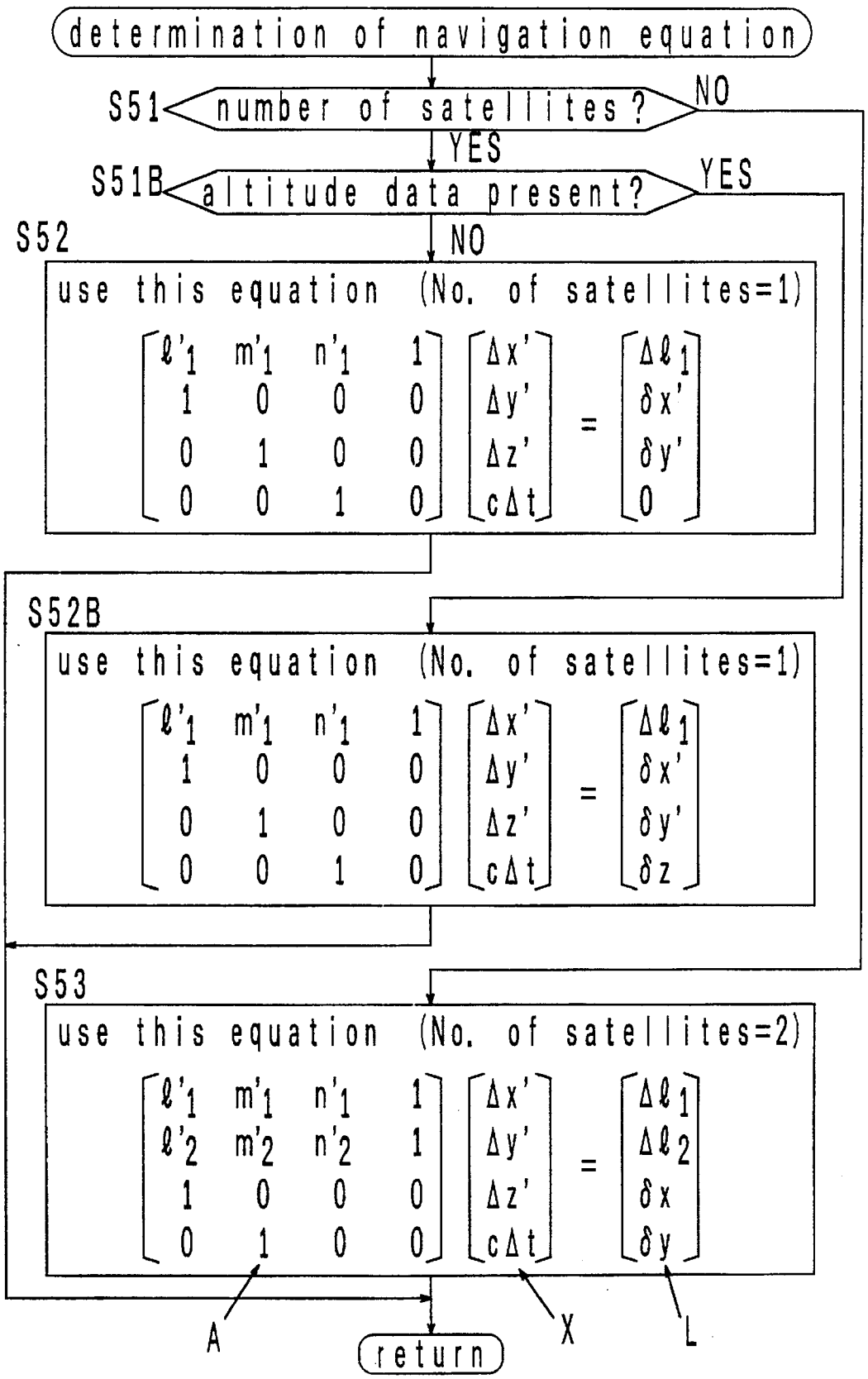
FIG. 5 is a flow chart showing a step S42 shown in FIG. 4 in detail.

The detail of the composite positioning calculation (step 34) shown in FIG. 3 is illustrated in detail in FIG. 4. Initially, measured values are input at step 41, and a navigation equation to be used is decided at next step S42. Specifically, referring to FIG. 5, an equation indicated at step S52 is used when the number of available satellites is equal to one, and an equation indicated at step 53 is used when the number of available satellites is equal to two.

In these equations, $\Delta x'$, $\Delta y'$ and $\Delta z'$ are the distances (unknown) along individual axes travelled by the vehicle in a time interval from the previous pass to the current pass, $\Delta t$ is a clock error (which is unknown) of the system, and c is the speed of light. $l'_i$, $m'_i$ and $n'_i$ are direction cosines which represents the orientation of an i-th satellite as viewed from the vehicle, and which can be determined on the basis of data transmitted from the respective satellites. $\delta x$ and $\delta y$ are travels of the vehicle along respective axes. $\Delta l'_i$ represents a variation in the distance from the position of the vehicle to the i-th satellite which occurs from the previous pass to the current pass, and which can be determined on the basis of data transmitted from the respective satellites. A technique for calculating various parameters will be described in detail later.

In the present embodiment, in order to minimize the magnitude of the error which occurs when determining an unknown variable in the navigation equation, a calculation according to an optimum filter, referred to as Kalman filter, is executed. Specifically, in this embodiment, a vector Xi at a given point in time is assumed to change to a vector Xi+1 at a next point in time by means of a physical model matrix Ci. The vector Xi is expressed in terms of $\Delta x$, $\Delta y$, $\Delta z$ and $c\Delta t$. The physical model matrix Ci is determined at step S43 in FIG. 4. Specifically, a physical model matrix Ci shown in FIG. 6 is used. At next step S44, a measurement error estimation matrix which indicates errors for the individual measured values is determined. This matrix is shown specifically in FIG. 7. At the following step S45, a matrix which indicates an error of the physical model is determined, and such matrix is specifically shown in FIG. 8.

At step 46, an examination is made to see if the content of a counter i, which indicates a number of times the composite positioning calculation (34) has been conducted, is equal to 0 or not, thus discriminating whether or not this is the first pass of calculation. If i=0, an initial value is loaded into a register at step S47. Specifically, the latest result of GPS independent positioning calculation (29) (including calculated values of $\Delta x$, $\Delta y$, $\Delta z$, $c\Delta t$ and their expected errors) is stored in a given register. If it is found that i is equal to or greater than 1 at step 46, the result of the composite positioning calculation (34) of the previous pass (again including the calculated values of $\Delta x$, $\Delta y$, $\Delta z$, $c\Delta t$ and their expected errors) is stored in a given register.

At next step 49, measured values are substituted into the formula for the Kalman filter, and is solved for an optimum estimate and its associated error. Specifically, the respective matrices of the navigation equation, the physical model matrix, measurement error estimation matrix and the physical model error matrix are substituted into the formula shown at step S91 in FIG. 9, and the indicated calculation is performed to obtain a solution.

Figure 20:
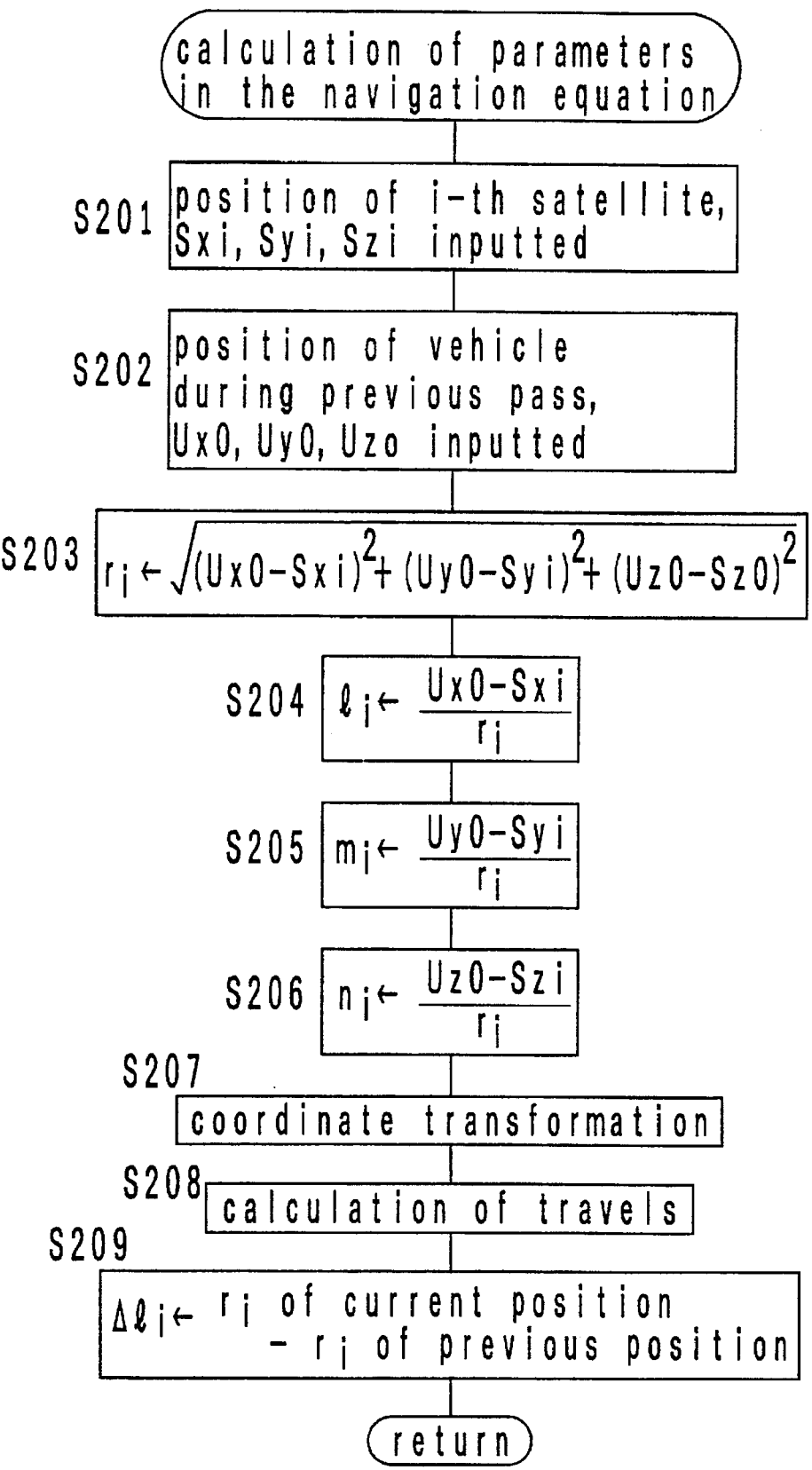
FIG. 20 is a flow chart showing the calculation of parameters used in a navigation equation in detail.

Parameters which are substituted in the respective matrices of the navigation equation are obtained by the execution of a processing operation shown in FIG. 20. Specifically, at step S201, coordinates Sxi, Syi and Szi, as referenced to an earth center coordinate system which is centered about the center of the earth, along the respective axes of the position of an i-th satellite are inputted. These values are obtained from the orbital function and the time which are transmitted from the satellite. At next step S202, coordinates Ux0, Uy0 and Uz0, again referenced to the earth center coordinate system, indicating the position of the vehicle which has been calculated during the previous pass, are inputted. These values are obtained from the result of the calculation of the previous pass. At step 203, a distance ri from the position of the i-th satellite to the position of the vehicle is calculated. At subsequent steps S204, S205 and S206, directions cosines $l_i$, $m_i$ and $h_i$, which define the direction of the i-th satellite when viewed from the vehicle are determined.

$$l_i = (Ux0 - Sxi)/ri$$

$$m_i = (Uy0 - Syi)/ri$$

$$n_i = (Uz0 - Szi)/ri$$

Figure 21:
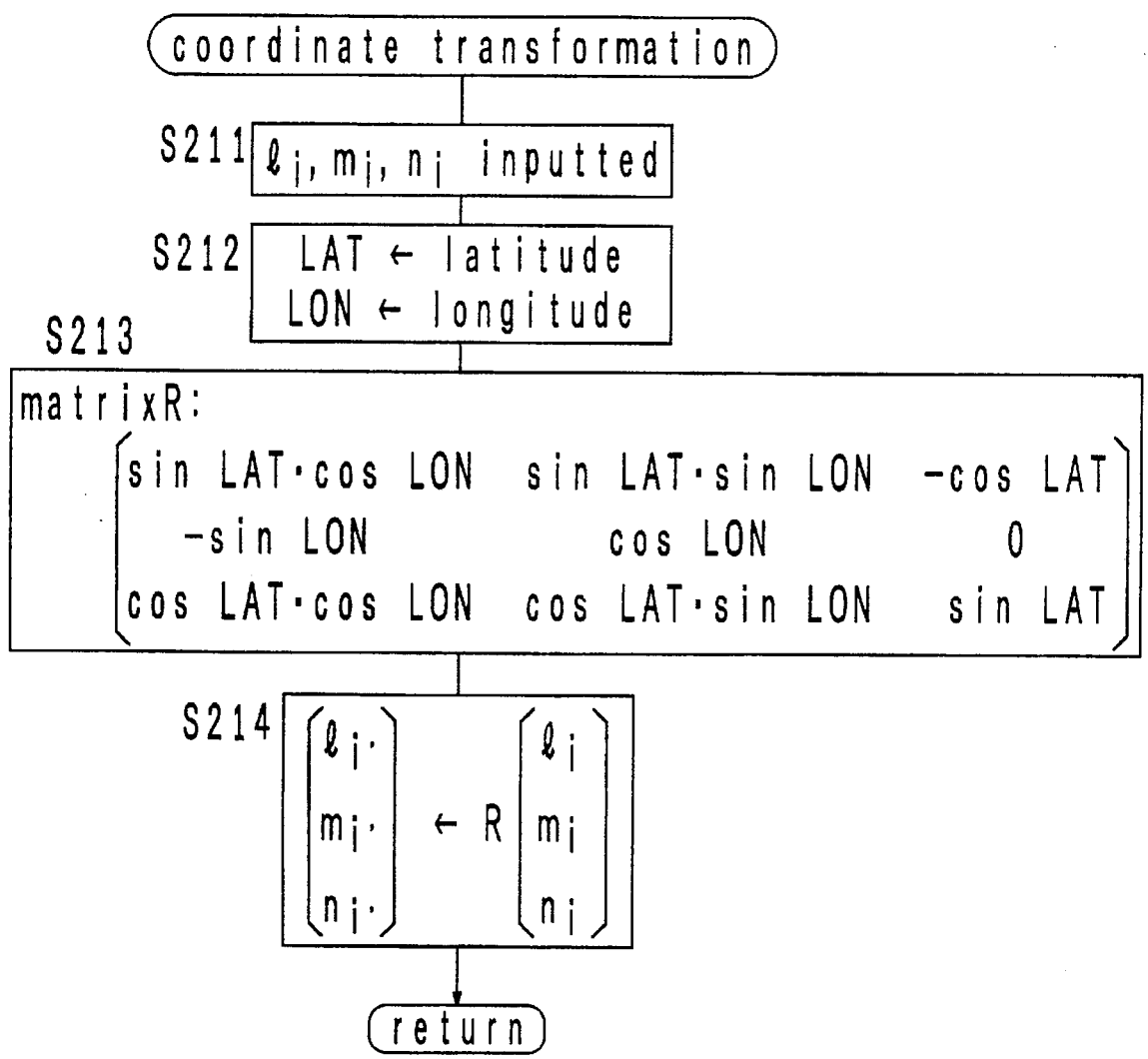
FIG. 21 is a flow chart showing a coordinate conversion in detail.

Since direction cosines as referenced to the earth surface coordinate system are used in the navigation equation (see FIG. 5), a coordinate transformation is performed at step S207, producing $l'_i$, $m'_i$ and $n'_i$ is referenced to the earth surface system from the direction cosines $l_i$, $m_i$ and $n_i$ as referenced to the earth center system. The coordinate transformation used is specifically illustrated in FIG. 21.

Figure 22:
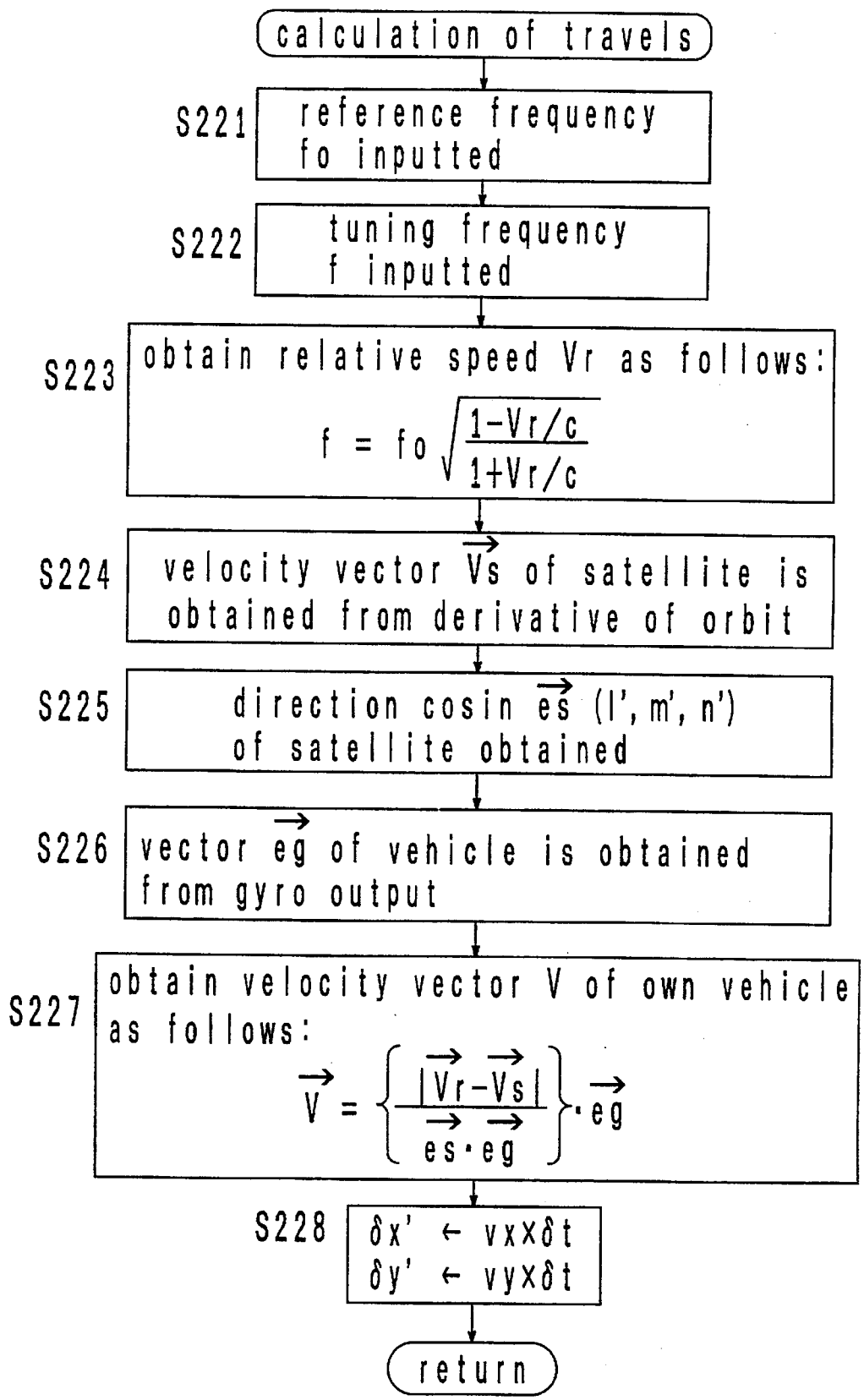
FIG. 22 is a flow chart showing the calculation of a travel in detail.
Figure 23:
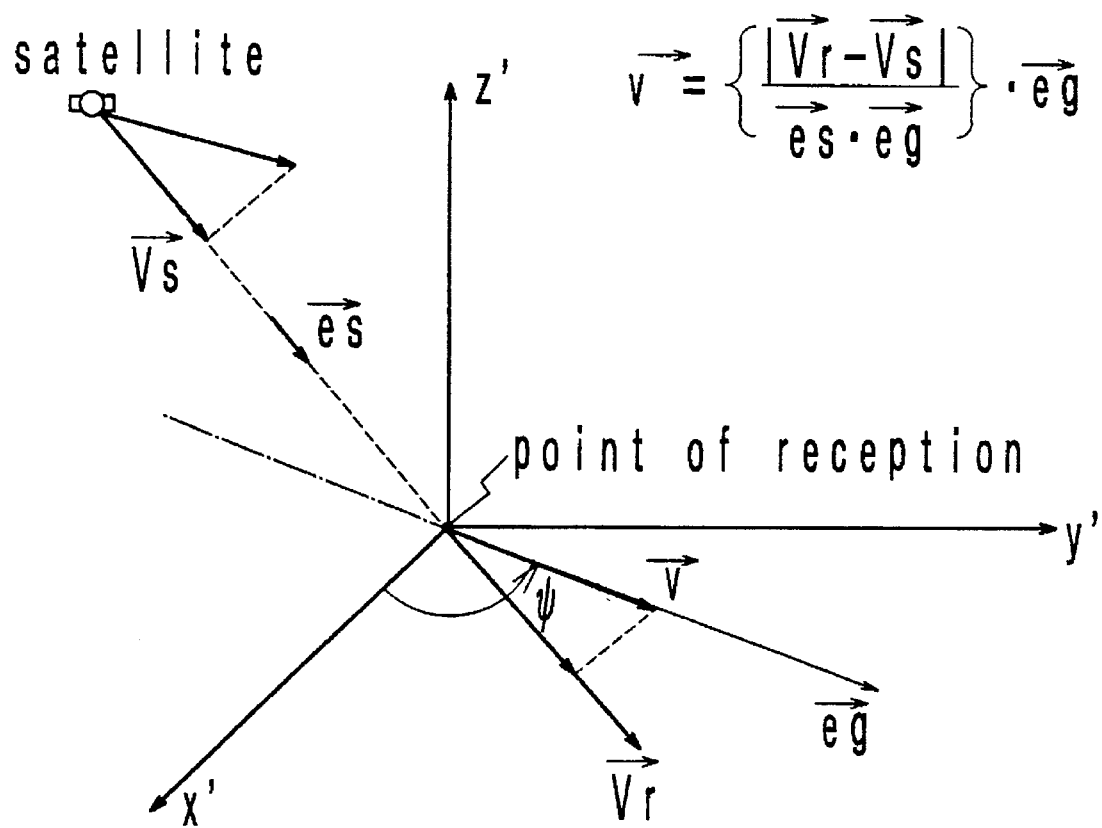
FIG. 23 is a vector diagram illustrating speed vectors at a satellite and a point of reception.

At next step S208, travels $\delta x$ and $\delta y$ of the vehicle from the previous pass to the current pass are obtained. This calculation is specifically shown in FIG. 22. Referring to FIG. 22, a reference frequency $f_0$ is inputted at step S221. In actuality, $f_0$ represents the frequency of a radio wave transmitted from GPS satellite, which is assumed to be substantially invariant, and accordingly, a constant is allotted to $f_0$ in the calculation. At next step S222, the tuning frequency f of GPS receiver is inputted. At step S223, a relative speed Vr in the axial direction or in a direction of a line joining the vehicle and the satellite is calculated.

Specifically, when the satellite which is a source of transmission of the radio wave moves relative to the vehicle which represents the point of reception of the radio wave, a change occurs in the frequency f of the radio wave at the point of reception in a manner corresponding to the relative speed Vr by Doppler effect, even if the frequency $f_0$ of the radio wave transmitted by the satellite remains constant. GPS receiver 11 performs a tuning operation in a manner so as to automatically tracks the frequency f of the radio wave received, so that the relative speed Vr can be determined from the tuning frequency f which is delivered by GPS receiver and the reference frequency $f_0$. The equation used for this calculation is shown at step S223.

At next step S224, a vector Vs representing the speed of the satellite is obtained. Because the orbital information of the respective satellites are already known, such information may be used to perform a differentiation of the orbit to derive the speed vector Vs of the satellite.

At step S225, a direction cosine es (unit vector) of the satellite is obtained. The direction cosine es includes $l'_i$, $m'_i$ and $n'_i$, which are already obtained until the step S207 is reached, and accordingly, such results are utilized.

At next step S226, a unit vector eg representing an orientation in which the vehicle proceeds is obtained. The orientation (or azimuth) $\phi$ in which the vehicle proceeds is obtained by integrating the angular speed of rotation ω which is delivered from the piezoelectric oscillation gyro 14.

A formula shown at step S227 is used to derive a speed vector v of the vehicle from the relative speed vector Vr, satellite speed vector Vs, the direction cosine es and the unit vector eg which represents the orientation in which the vehicle proceeds.

At step 228, the travels δx and δy, along the respective axes, of the vehicle are obtained from the components vx and vy along the respective axes of the speed vector v and the time increment δt.

Returning to FIG. 20, at step S209, a change in the distance ri (referred to as equivalent range) between the position of the vehicle and the position of the i-th satellite which occurred during a time interval from the previous pass and the current pass is calculated, and is denoted as $\Delta l_i$.

Figure 10:
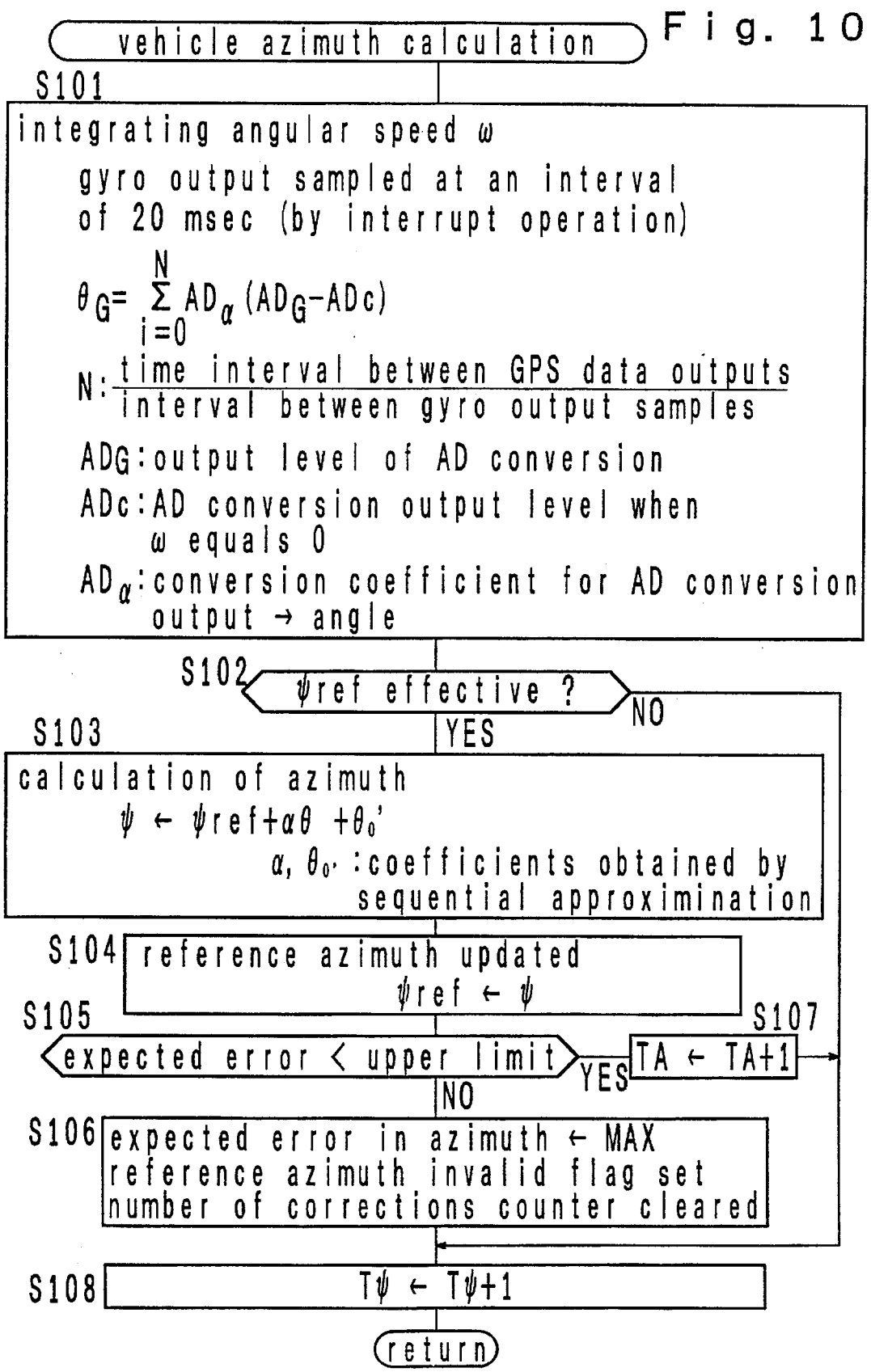
FIG. 10 is a flow chart showing a step 26 shown in FIG. 3 in detail.
Figure 11:
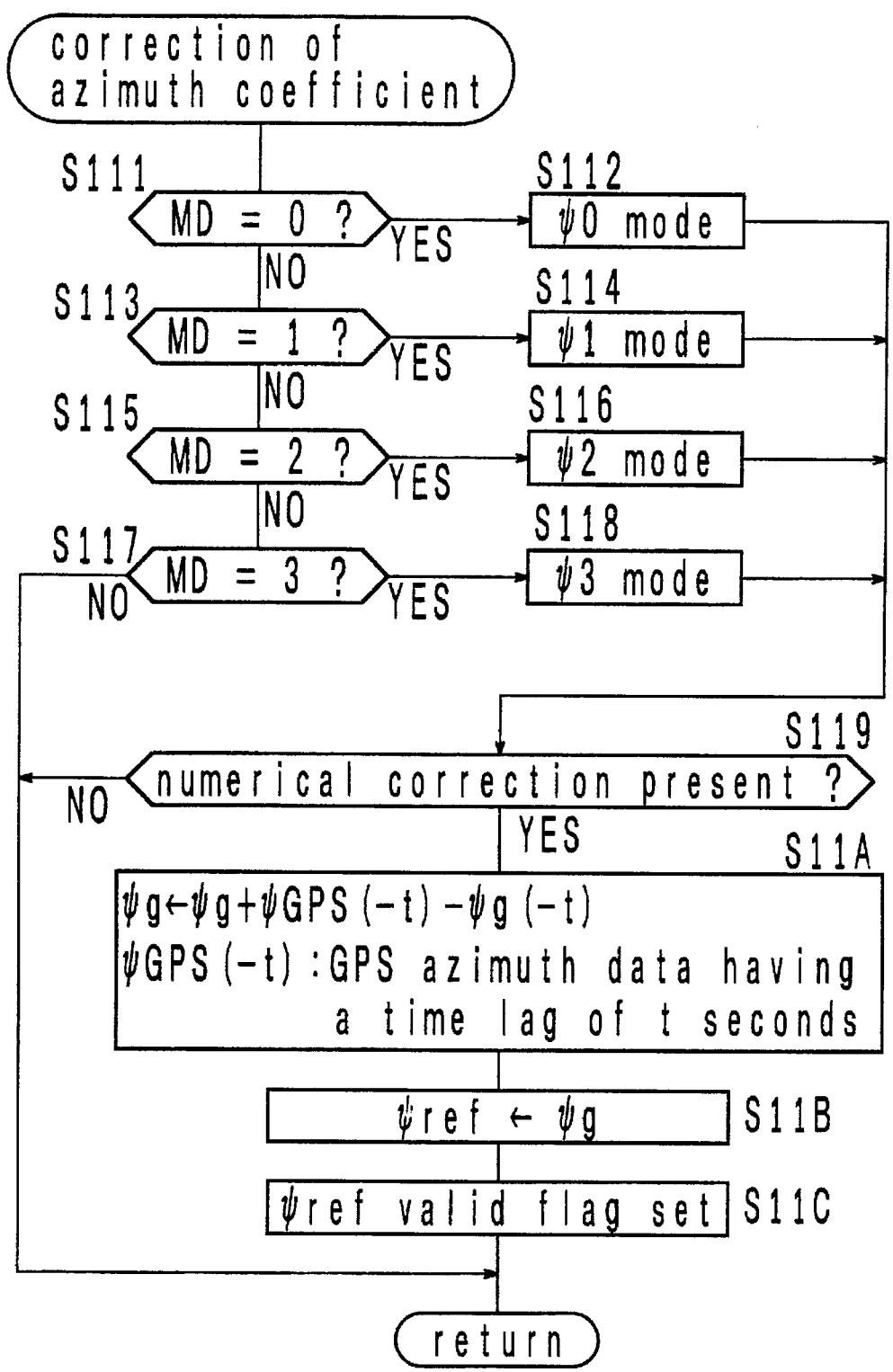
FIG. 11 is a flow chart showing a step 31 shown in FIG. 3 in detail.

The detail of a vehicle azimuth angle calculation which is performed at step 26 in FIG. 3 is specifically shown in FIG. 10 while an azimuth coefficient correction which is performed at step 31 in FIG. 3 is specifically shown in FIG. 11. Referring to FIG. 10, the vehicle azimuth angle calculation will be described first.

Initially, at step 101, an integration of the sampled angular speed ω is executed. In actuality, an A/D conversion output $AD_G$ of the angular speed signal is sampled in synchronism with a timer interrupt which occurs every 20 msec, and a change in angle $\theta_G$ is obtained by integrating a result of calculation which utilizes coefficients ADc and ADα.

When the reference azimuth φref is effective, the program proceeds from step S102 to S103, calculating the prevailing azimuth angle φ. Thus, the azimuth angle φ is equal to a result of calculation of φref+α$\theta'_G$+$\theta'_0$. At next step S104, the current azimuth angle φ is made as a new reference azimuth φref.

When an expected error of the azimuth angle φ is at its upper limit, or when a correct azimuth angle has not been calculated, the program proceeds from step S105 to step S106 where a maximum value is stored in a register which indicates an expected error of the azimuth angle, a reference azimuth invalid flag is set and a number of corrections counter is cleared.

Referring to FIG. 11 to describe the azimuth angle coefficient correction, it is to be understood that there are four correction modes in this embodiment. Either one of φ0-mode correction, φ1-mode correction, φ2-mode correction or φ3-mode correction is executed depending on the content of a mode register MD. Whenever an instruction of "numerical correction" is encountered, the program proceeds from step S119 to step S11A where azimuth angle data φGPS which has been obtained as a result of GPS independent positioning calculation is utilized to correct the azimuth angle data φg which is calculated in accordance with an output from the gyro. However, since the azimuth angle data φGPS involves a time lag of t-seconds, the azimuth angle data φg which is used for the comparison is one which prevails t-seconds ago. Thus, a difference between two different azimuth angle data which prevails at the same point in time, φGPS(–t)–φg(–t), is regarded as an azimuth error Δφ, which is added to the current azimuth angle data φg for purpose of correction. In order to allow reference to the azimuth angle data φg of the previous passes, the azimuth angle data φg is calculated every 0.1 second in this embodiment, and an assembly of such azimuth angle data φg which extends over past several seconds are saved in a memory. At a next step S11B, the current azimuth angle data φg as corrected is stored as a reference azimuth φref, followed by setting the reference azimuth valid flag at the next step S11C.

Figure 12:
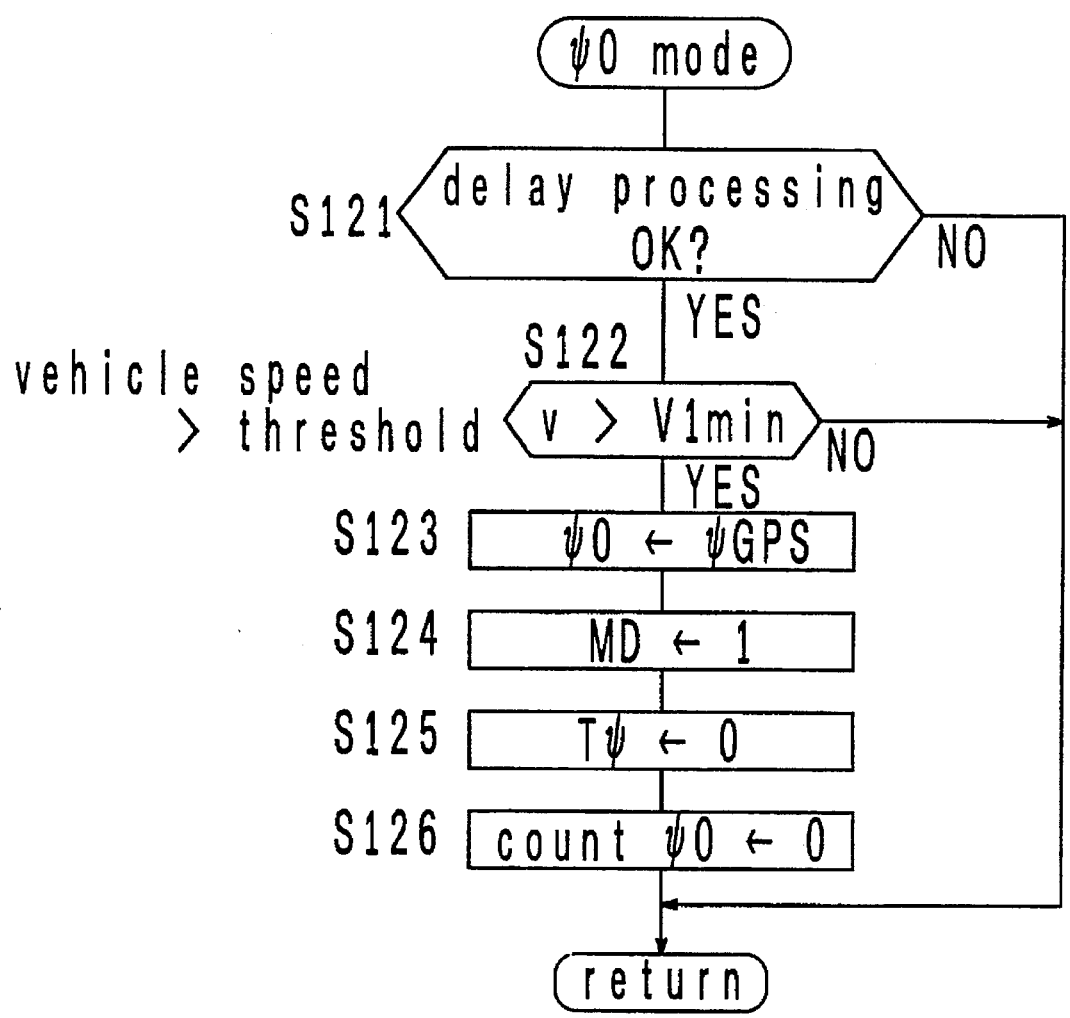
FIG. 12 is a flow chart showing part of the processing shown in FIG. 11 in detail.

The detail of the φ0-mode correction shown in FIG. 11 is specifically shown in FIG. 12. The detail of φ1-mode correction is specifically shown in FIG. 13; the detail of the φ2-mode correction is specifically shown in FIG. 14; and the detail of the φ3-mode correction is specifically shown in FIGS. 15 and 16. Initially referring to FIG. 12 for the description of the φ0-mode correction, at initial step S121, an examination is made to see if there exists azimuth angle data φg(–t) which prevailed at t-seconds earlier corresponding to the time lag of the latest azimuth angle data φGPS which is obtained by the GPS independent positioning calculation, by a delay processing operation, not shown. If it is found that such azimuth angle data φg(–t) exists, the program proceeds to step S122 where the vehicle speed v is compared against the predetermined threshold value V1min. If v>V1min, the program proceeds to step S123. Thus, the azimuth error contained in the solution obtained by the GPS independent positioning calculation is represented as arctan (0.72/(v+0.72)), which increases in magnitude for a lower value of the vehicle speed v. Accordingly, when the error is small, or when the vehicle speed v is greater than V1min, the azimuth angle data φGPS is regarded as valid.

At step 123, latest azimuth angle data φGPS is stored in a register φ0, and at next step S124, the mode register MD is set to 1. At next step S125, a time register Tφ is cleared, and at step S126, a counter "COUNT φ0" is cleared. When the mode register MD is set to 1, the program transfers to the φ1-mode during the next pass.

Figure 13:
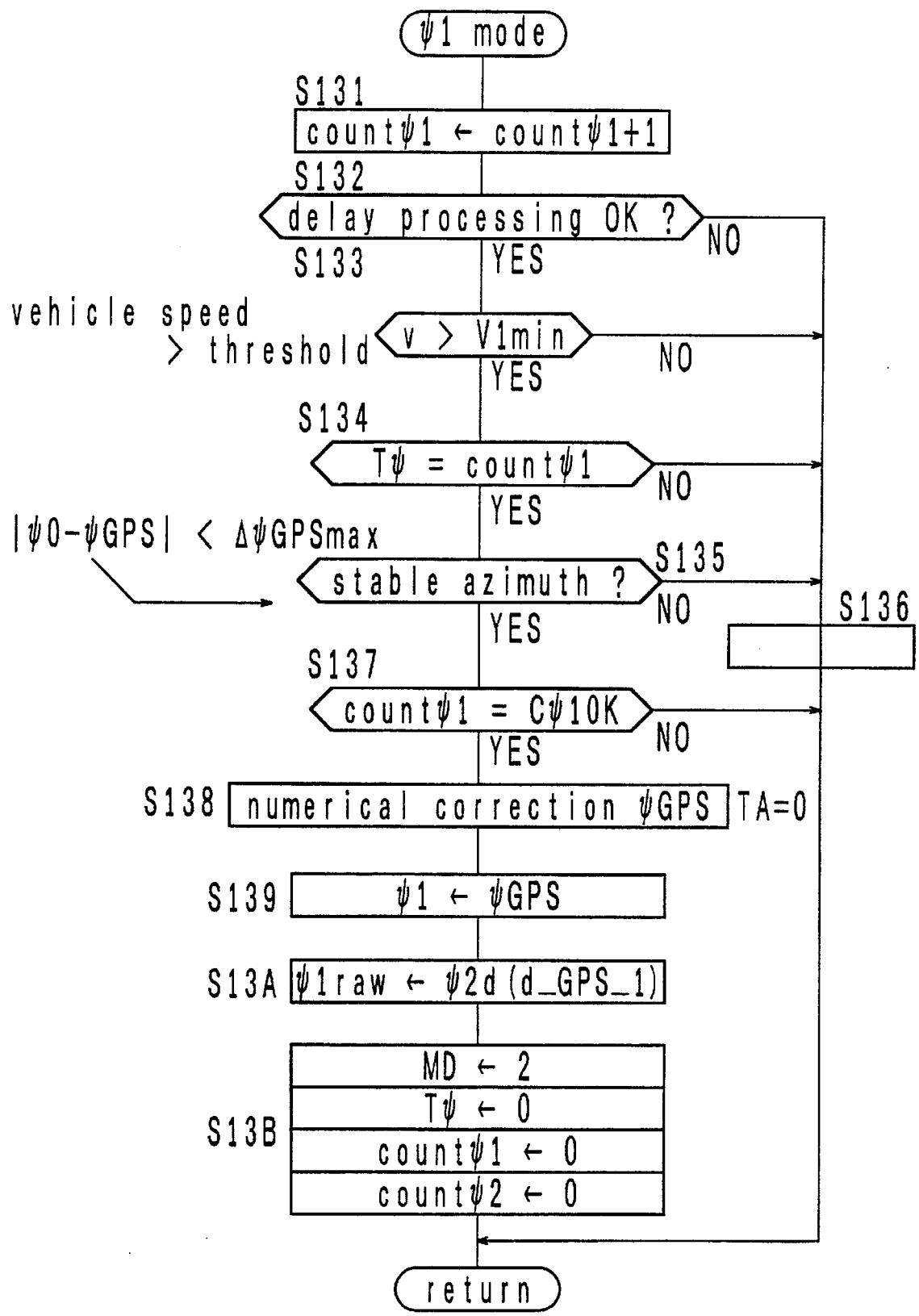
FIG. 13 is a flow chart of part of the processing shown in FIG. 11 in detail.

Referring to FIG. 13 for the description of the φ1-mode correction, a count "COUNT φ1" is incremented by one at step 131. At next step S132, an examination is made to see if there exists azimuth angle data φg(–t) which prevailed t-seconds earlier corresponding to the time lag of the latest azimuth angle data φGPS which is obtained as a result of the GPS independent positioning calculation. If the azimuth angle data φg(–t) exists, the program proceeds to step S133 where the vehicle speed v is compared against the predetermined threshold value V1min. If v>V1min, the program proceeds to step S134 where Tφ is compared against a counter "COUNT φ1" and if the both matches, the program proceeds to step S135.

An examination is made to see if the orientation or azimuth of the vehicle is stable at step S135. Specifically, a rate of change in the azimuth angle obtained by dividing a difference between $\phi 0$ detected during the $\phi 0$-mode and the latest azimuth angle data $\phi$GPS, which is divided by a time interval T(0) between the respective detections is compared against an upper limit $\Delta\phi$GPSmax. If the rate of change is less than the upper limit, the program proceeds to step S137 where the counter "COUNT $\phi 1$" is examined if it is equal to a given value C$\phi$1OK. It is to be noted that d__GPS__0 represents a time lag for $\phi 0$ and d__GPS__1 a time lag for $\phi$GPS. When it is found that the azimuth of the vehicle is stable, the program proceeds to step S138.

At step S138, a numerical correction flag (a command for correction of a numerical value) is set, and a stand-alone timer (which counts a time interval during which azimuth data has not been subjected to any correction) TA is cleared. At next step S139, the latest azimuth angle data $\phi$GPS is stored in a register $\phi 1$, and at next step S13A, azimuth angle data from the gyro which matches in time with the latest azimuth angle data $\phi$GPS is read from a memory, and is stored in a register $\phi$1raw.

At step S13B, 2 is loaded into the mode register MD, the time register T$\phi$ is cleared, as is the counters "count $\phi 1$" and "count $\phi 2$". When 2 is loaded into the mode register MD, the next pass shifts to $\phi 2$-mode. If any one of the requirements defined at steps S132, S133, S134 and S135 is not satisfied, the mode register MD is cleared at step S136, and accordingly, the next pass returns to $\phi 0$-mode.

Figure 14:
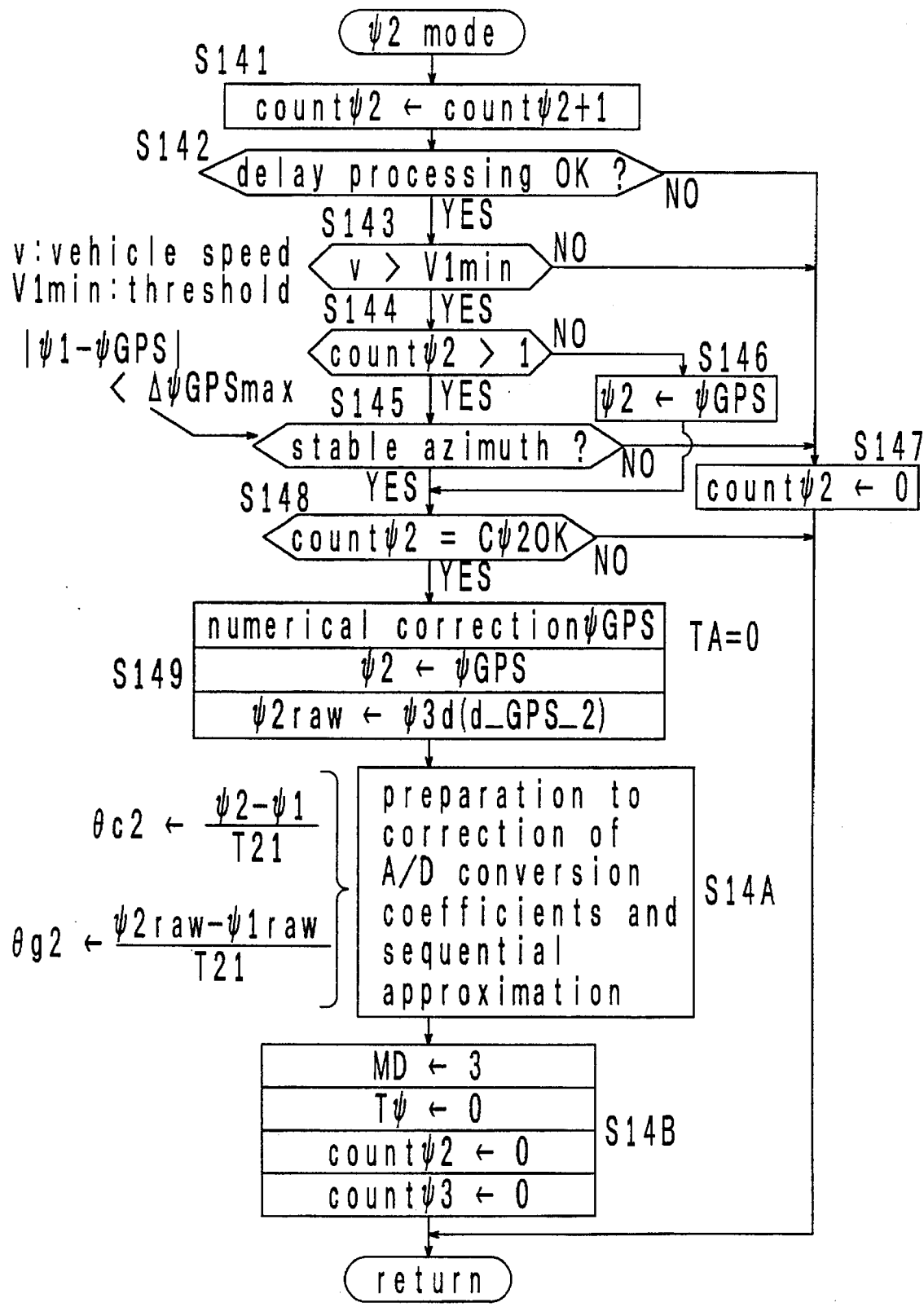
FIG. 14 is a flow chart of part of the processing shown in FIG. 11 in detail.

Referring to FIG. 14, $\phi 2$-mode correction will be described. Initially, at step S141, the counter "count $\phi 2$" is incremented by one. At next step S142, an examination is made to see if azimuth angle data $\phi g(-t)$ exists which prevailed t-seconds earlier which corresponds to a time lag of the latest azimuth angle data $\phi$GPS which is obtained as a result of the GPS independent positioning calculation. If the azimuth angle data $\phi g(-t)$ does exist, the program proceeds to step S143 where the vehicle speed v is compared against the predetermined threshold value V1min. If v>V1min, the program proceeds to step S144 where the counter "count $\phi 2$" is examined, and if "count $\phi 2$">1, the program proceeds to step S145, and otherwise, the program proceeds to step S146 where the latest azimuth angle data $\phi$GPS is stored in a register $\phi 2$, followed by proceeding to step S148.

An examination is made at step S145 to see if the azimuth or orientation of the vehicle is stable. Specifically, a rate of change in the azimuth angle which is obtained by dividing a difference between $\phi 1$ detected during the $\phi 1$-mode and the latest azimuth angle data $\phi$GPS by the time interval T(1) which passed between such detections is compared against an upper limit $\phi$GPSmax. If the rate of change is less than the upper limit, the program proceeds to step S148 where it is examined if the counter "count $\phi 2$" is equal to a given value C$\phi$2OK. It is to be noted that d__GPS__1 represents a time lag for $\phi 1$ and d__GPS__2 a time lag for latest $\phi$GPS. If the azimuth of the vehicle is found to be stable, the program proceeds to step S149.

At step S149, the numerical correction flag (a command for correcting a numeral value) is initially set, and the stand-alone timer TA is then cleared. Subsequently, the latest azimuth angle data $\phi$GPS is stored in the register $\phi 2$, and azimuth angle data from the gyro which matches in time with the latest azimuth angle data $\phi$GPS is read from the memory, and is stored in the register $\phi$2raw.

At step S14A, required parameters are calculated in preparation to the correction of A/D conversion coefficients and sequential approximation. Specifically, a difference between azimuth angle data $\phi 2$ and $\phi 1$ is divided by a time interval T21 between such detections, to derive a result which is stored in a register $\theta c2$, and a difference between azimuth angle data $\phi$2raw and $\phi$1raw is divided by a time interval T21 between such detections to derive a result which is also stored in a register $\theta g2$.

At step S14B, 3 is loaded into the mode register MD, the time register T$\phi$ is cleared, as are the counters "count $\phi 2$" and "count $\phi 3$". When 3 is loaded into the mode register MD, the next pass shifts to the $\phi 3$-mode. When any one of the requirements defined at steps S142, S143 and S145 is not satisfied, the counter "count $\phi 2$" is cleared at step S147.

Figure 15:
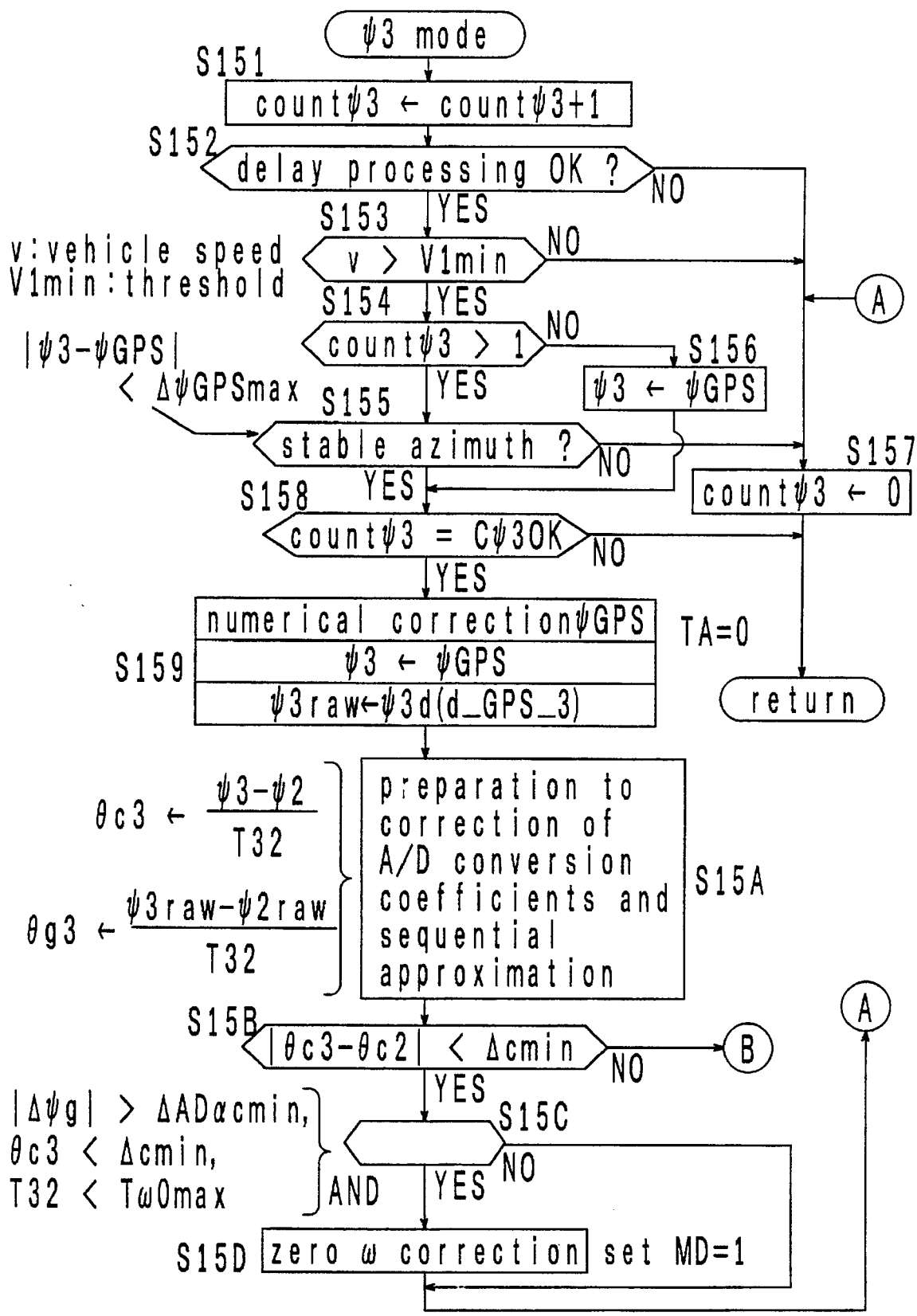
FIG. 15 is a flow chart of part of the processing shown in FIG. 11 in detail.

Referring to FIG. 15 for describing the $\phi 3$-mode correction, a counter "count $\phi 3$" is incremented by one at initial step S151. At next step S152, an examination is made to see if there exists azimuth angle data $\phi g(-t)$ which prevailed t-seconds earlier corresponding to the time delay for the latest azimuth angle data $\phi$GPS which was obtained as a result of the GPS independent positioning calculation. When the azimuth angle data $\phi g(-t)$ does exist, the program proceeds to step S153 where the vehicle speed v is compared against the predetermined threshold value V1min. If v>V1min, the program proceeds to step S154 where the counter "count $\phi 3$" is examined, and if it is found that "count $\phi 3$">1, the program proceeds to next step S155, and otherwise, the program proceeds to step S156 where the latest azimuth angle data $\phi$GPS is stored in a register $\phi 3$, followed by proceeding to step S158.

At step S155, an examination is made to see if the azimuth of the vehicle is stable. Specifically, a rate of change in the azimuth angle which is obtained by dividing a difference between $\phi 2$ detected during the $\phi 2$-mode and the latest azimuth angle data $\phi$GPS by a time interval T(2) between such detections is compared against an upper limit $\Delta\phi$GPSmax. If it is found that the rate of change is less than the upper limit, the program proceeds to next step S158 where the counter "count $\phi 3$" is examined to see if it has reached a given value C$\phi$3OK. It is to be noted that d__GPS__2 represents a time delay for $\phi 2$ and d__GPS3 a time delay for latest $\phi$GPS. If the azimuth of the vehicle is stable, the program proceeds to step S159.

At next step S15A, necessary parameters are calculated in preparation to the correction of A/D conversion coefficients and sequential approximation. Specifically, a difference between azimuth angle data $\phi 3$ and $\phi 2$ is divided by a time interval T32 between such detections, with the result stored in a register $\theta c3$, and a difference between azimuth angle data $\phi$3raw and $\phi$2raw is divided by a time interval T32 between such detections, with the result stored in a register $\theta g3$.

Figure 16:
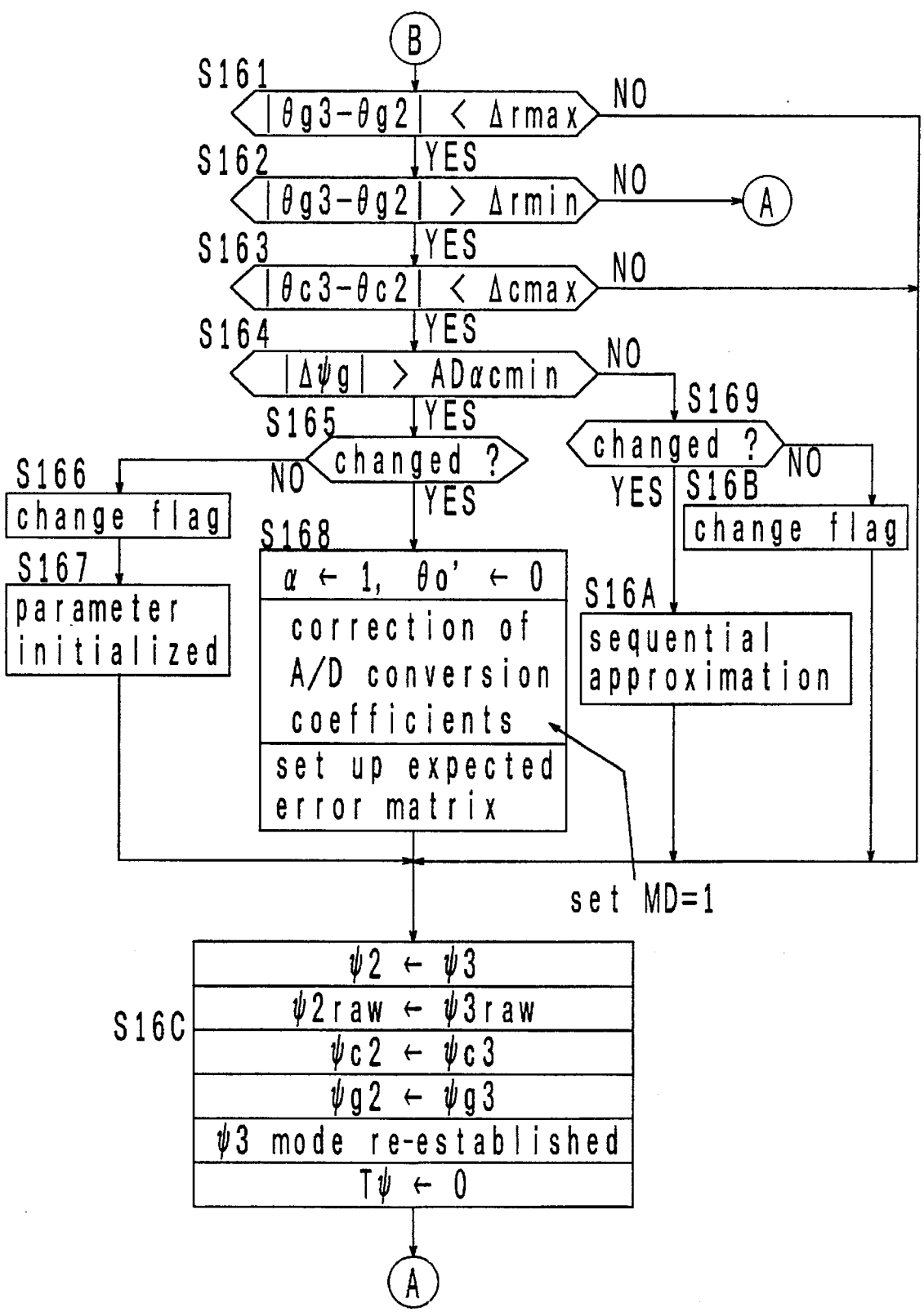
FIG. 16 is a flow chart of part of the processing shown in FIG. 11 in detail.

At subsequent step S15B, a difference between $\theta c3$ and $\theta c2$ is compared against a lower limit $\Delta$cmin, and if |$\theta c3$−$\theta c2$|<the lower limit, the program proceeds to step S15C, and otherwise, the program proceeds to step S161 shown in FIG. 16.

In addition, at step S15C, an examination is made to see if requirements |$\Delta\phi g$|>AD$\alpha$cmin (lower limit), $\theta c3$<$\Delta$cmin and T32<T$\omega$0max (upper limit) are satisfied, and when all of these requirements are satisfied, "zero correction" is executed at step S15D.

Referring to FIG. 16, the requirement |$\theta g3$−$\theta g2$|<$\Delta$rmax is examined at step S161; the requirement |$\theta g3$−$\theta g2$|>$\Delta$rmin is examined at step S162; the requirement |$\theta c3$−$\theta c2$|<$\Delta$cmax is examined at step S163; and the requirement |$\Delta\phi g$|>AD$\alpha$cmin is examined at step S164. When all the requirements defined at steps S161, S162 and S163 are satisfied, either one of an A/D conversion coefficient correction mode or a sequential approximation correction mode is selected depending on the result of examination of the requirement defined at step S164.

Specifically, if $|\Delta\phi g|>AD\alpha cmin$, the A/D conversion coefficient correction mode is selected, and otherwise the sequential approximation correction mode is selected. Whenever $|\Delta\phi g|\leq AD\alpha cmin$ is found during the A/D conversion coefficient correction mode, the program proceeds from step S169 to S16B where a flag is set to select the sequential approximation correction mode. If $|\Delta\phi g|>AD\alpha cmin$ is found during the sequential approximation correction mode, the program proceeds from step S165 to step S166 where a flag is set to select the A/D conversion coefficient correction mode, followed by next step S167 where parameters (the number of sequential approximations, a solution obtained during the previous pass) are initialized.

When the sequential approximation correction mode is selected, the program proceeds from step S169 to step S16A where "sequential approximation" routine is executed. When the A/D conversion coefficient correction mode is selected, the program proceeds from step S165 to step S168 where 1 is stored in a register $\alpha$, $\theta 0'$ is cleared, "A/D conversion coefficient correction" routine is executed and an expected error matrix is set up.

At subsequent step S16C, the content of the register $\phi 3$ is stored in the register $\phi 2$, the content of the register $\phi 3$raw is stored in the register $\phi 2$raw, the content of the register $\phi c3$ is stored in the register $\phi c2$, the content of the register $\phi g3$ is stored in the register $\phi g2$, the $\phi 3$-mode is re-established and the register $T\phi$ is cleared, followed by proceeding to step S157 shown in FIG. 15.

Figure 17:
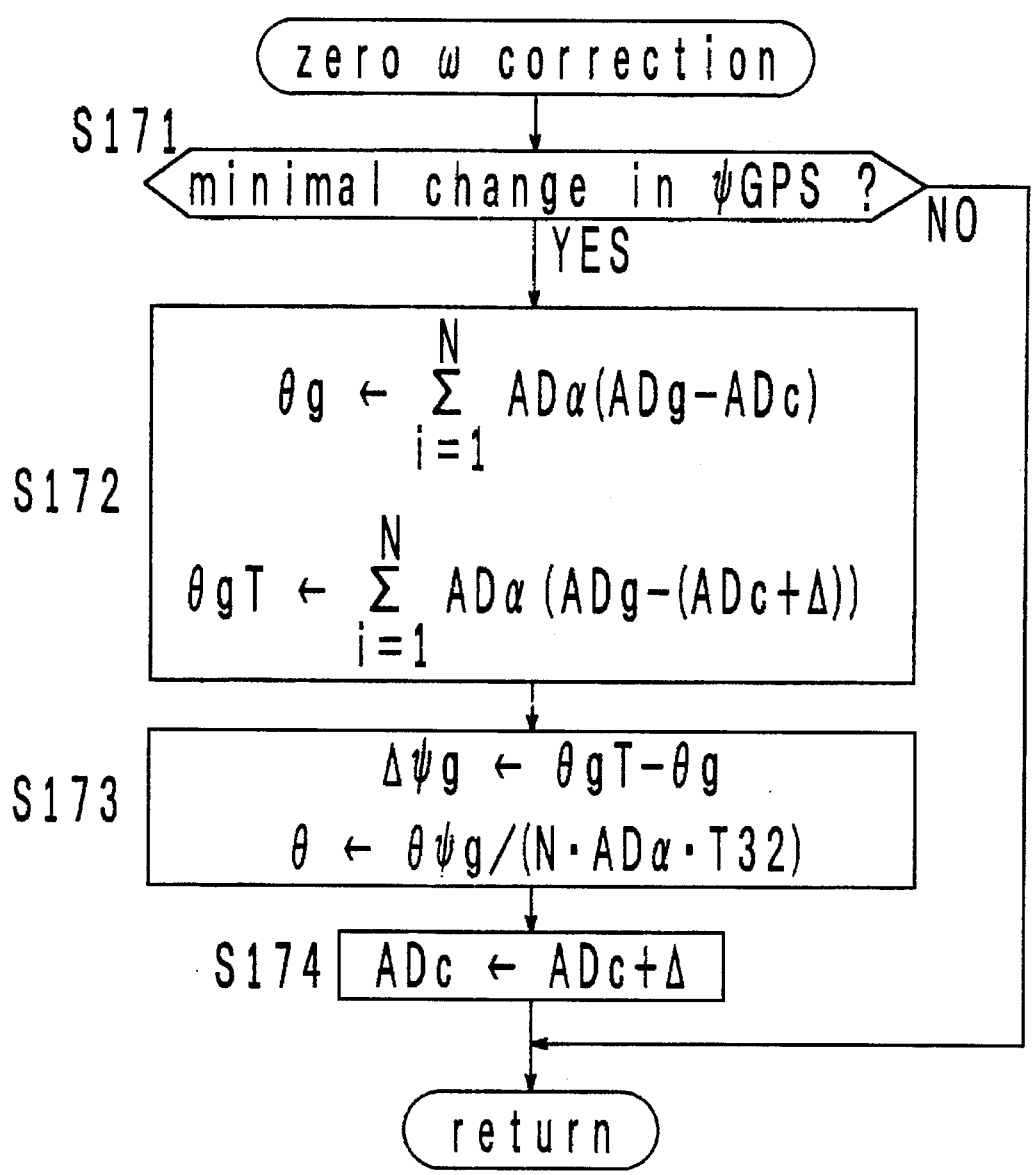
FIG. 17 is a flow chart showing zero ω correction in detail.

The detail of the zero $\omega$ correction shown at step S15D is indicated in FIG. 17. It is to be understood in describing FIG. 17 that in the event there is no significant change in the azimuth angle data $\phi GPS$ which is obtained by the GPS independent positioning calculation, any error $\Delta\phi g$ between the azimuth angle data $\phi$ which is calculated from the gyro output and $\phi GPS$ is substantially attributable to A/D conversion coefficient ADc. Accordingly, in the zero $\omega$ correction, the A/D conversion coefficient ADc is modified. At step S172, a change in the angle $\phi g$ is obtained from N samples ADg of the angular speed $\omega$ which occurs during a given time interval, and after a time interval T32, N samples ADg of the angular speed $\omega$ are again obtained. From these samples obtained at different times, a change in the angle $\theta gT$ is calculated. At next step S173, a difference between these two changes in the angle is obtained as an error $\Delta\phi g$, and a coefficient correction $\Delta$ is obtained from $\Delta\phi g$. At step S174, the coefficient correction $\Delta$ is added to the A/D conversion coefficient ADc.

Figure 18:
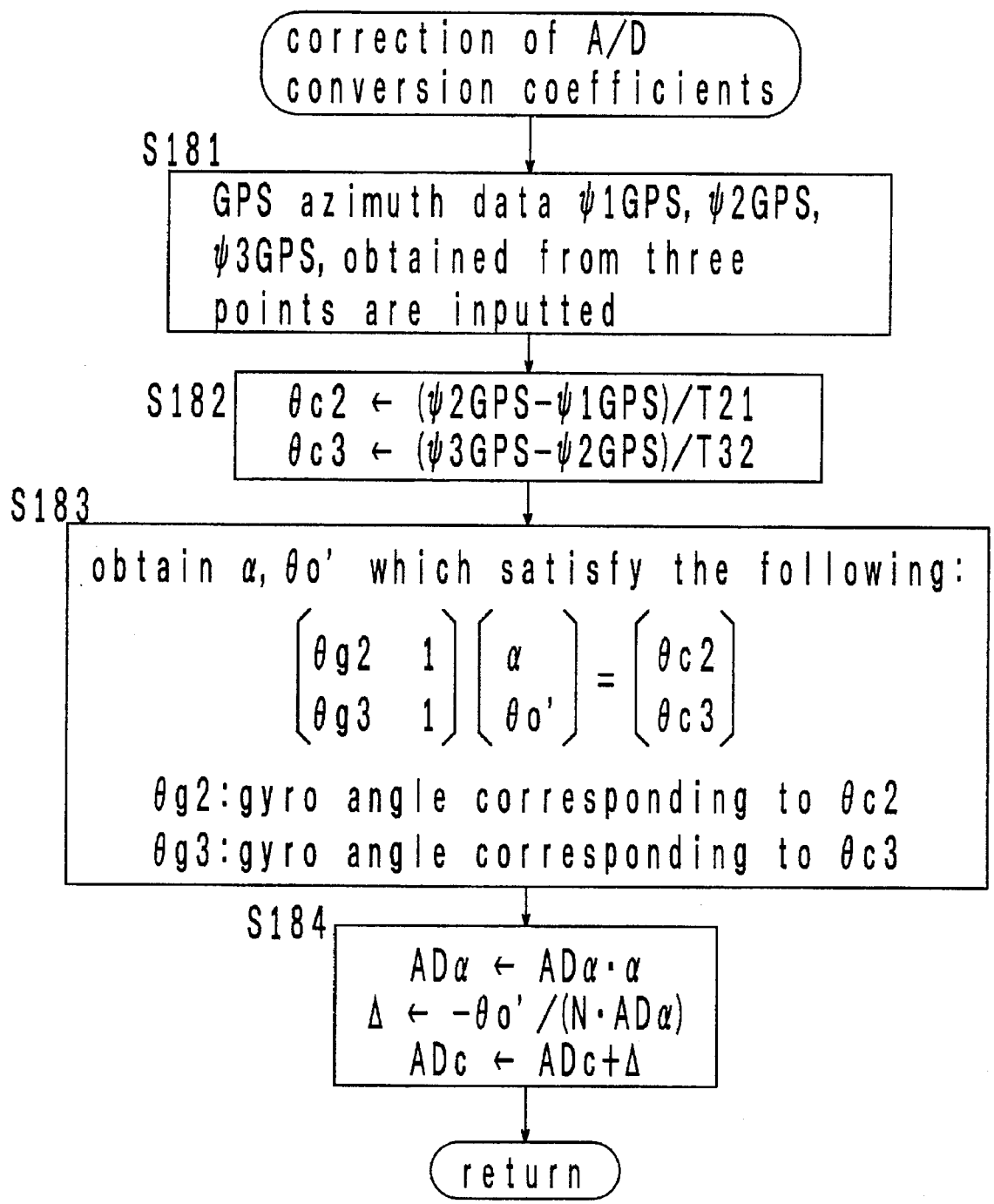
FIG. 18 is a flow chart showing the correction of an A/D conversion coefficient in detail.

The detail of "A/D conversion coefficient correction" shown at step 168 is indicated in FIG. 18. Referring to FIG. 18, at step S181, GPS azimuth data $\phi 1$ GPS, $\phi 2$ GPS and $\phi 3$ GPS which are obtained by the GPS independent positioning calculation performed at three mutually different points are made as inputs. In actuality, azimuth data $\phi 1$ GPS is detected during the $\phi 1$-mode, and is already stored in the register $\phi 1$ at step 139; $\phi 2$ GPS is detected during the $\phi 2$-mode and is already stored in the register $\phi 2$ at step 149; and $\phi 3$ GPS is detected during the $\phi 3$-mode and is already stored in the register $\phi 3$ at step 159, and accordingly such data may be utilized.

At next step S182, a difference between azimuth data $\phi 2$ GPS and $\phi 1$ GPS obtained at two points are divided by a time interval T21 therebetween, with the result, which means a change in the azimuth occurring per unit time, is stored in the register $\theta c2$. A difference between azimuth data $\phi 3$ GPS and $\phi 2$ GPS obtained at another pair of different points is divided by a time interval T32 therebetween, with the result, which again means a change in the azimuth occurring per unit time, is stored in the register $\theta c3$. In actuality, the change in the azimuth $\theta c2$ has already been obtained during the $\phi 2$-mode at step S14A, and the change in the azimuth $\theta c3$has also been determined during the $\phi 3$-mode at step S15A, and such information may be directly utilized. At step S14A, a change in the azimuth $\theta g2$ which is detected by the gyro and corresponding to the change in azimuth $\theta c2$ is determined while at step S15A, a change in the azimuth $\theta g3$ detected by the gyro and corresponding to the change in the azimuth $\theta c3$has also been determined, and accordingly such information may be utilized in the next step.

At step S183, parameters $\theta g2$, $\theta g3$, $\theta c2$ and $\theta c3$ obtained in these manners are substituted into a given formula to derive coefficients $\alpha$ and $\theta'_0$. By utilizing the coefficients $\alpha$ and $\theta'_0$ obtained in this manner, A/D conversion coefficients AD$\alpha$ and ADc are corrected at next step S184.

The detail of "sequential approximation" shown at step S16A is indicated in FIG. 19. Referring to FIG. 19, GPS azimuth data $\phi 1$ GPS, $\phi 2$ GPS and $\phi 3$ GPS obtained by the GPS independent positioning calculation at three, mutually different points are made as inputs. In actuality, however, azimuth data $\phi 1$ GPS is detected during the $\phi 1$-mode, and is already stored in the register $\phi 1$ at step 139; $\phi 2$ GPS is detected during the $\phi 2$-mode and is already stored in the register $\phi 2$ at step S149; and $\phi 3$ GPS is detected during the $\phi 3$-mode and is already stored in the register $\phi 3$ at step S159, and accordingly such data may be utilized.

At step 192, a difference between azimuth data $\phi 2$ GPS and $\phi 1$ GPS obtained at two points is divided by the time interval T21, and the result, which represents a change in the azimuth occurring per unit time, is stored in the register $\theta c2$. A difference between azimuth data $\phi 3$ GPS and $\phi 2$ GPS obtained at another pair of points is divided by the time interval T32, and the result is stored in the register $\theta c3$. However, in actuality, the change in the azimuth $\theta c2$ is already obtained during the $\phi 2$-mode at step S14A, and the change in the azimuth $\theta c3$has already been obtained during the $\phi 3$-mode at step S15A, and such information may be directly utilized. In addition, the change in the azimuth $\theta g2$ as detected by the gyro and corresponding to the change in azimuth $\theta c2$ is determined at step S14A, and the change in the azimuth $\theta g3$ as determined by the gyro and corresponding to the change in the azimuth $\theta c3$is determined at step S15A, and accordingly such information can be utilized during the subsequent steps.

At step S193, a formula or relationship for determining correction coefficients is determined, and at step S194, a measuring error estimation matrix is determined. At subsequent step S195, an examination is made to see if a solution of the previous pass exists. If a solution of the previous pass does not exist, meaning that this is the calculation of the first pass, the program proceeds to step S196 where an initial value is set as a solution, which is used during the calculation of a next pass. When a solution of a previous pass (i-th pass) does exist, the program proceeds from step S195 to step S197 where a calculation for the sequential approximation is executed, thus obtaining (i+1)-th solution X (coefficients $\alpha$ and $\theta'_0$) and its associated error. The coefficients $\alpha$ and $\theta'_0$ thus obtained are used to correct the coefficients AD$\alpha$ and ADc in the same manner as at step S184.

While not shown, "higher order coefficient correction" occurring at step 30 shown in FIG. 3 takes place in the similar manner as the "azimuth angle coefficient correction" mentioned above. Specifically, an accurate altitude z(GPS) which is obtained by the GPS independent positioning calculation is used to correct an altitude z(ALT) which is obtained from an output signal from the altitude sensor 15, and various coefficients which are used when converting the level of the output signal from the altitude sensor 15 to the altitude z(ALT) are corrected in accordance with the magnitude of the altitude z(GPS). "Numerical correction", "A/D conversion coefficient correction" and "sequential approximation" are provided in the similar manner as the "azimuth angle coefficient correction" and are executed as required.

In the GPS independent positioning calculation, unknown variables $\Delta x'$, $\Delta y'$, $\Delta z'$ and $c\Delta t$ are determined by solving the navigation equation defined by either one of the following equations (1) and (2).

$$\begin{bmatrix} l_1 & m'_1 & n'_1 & 1 \\ l_2 & m'_2 & n'_2 & 1 \\ l_3 & m'_3 & n'_3 & 1 \\ l_4 & m'_4 & n'_4 & 1 \end{bmatrix} \begin{bmatrix} \Delta x \\ \Delta y \\ \Delta z \\ c\Delta t \end{bmatrix} = \begin{bmatrix} \Delta l_1 \\ \Delta l_2 \\ \Delta l_3 \\ \Delta l_4 \end{bmatrix} \quad (1)$$

$$\begin{bmatrix} l_1 & m'_1 & n'_1 & 1 \\ l_2 & m'_2 & n'_2 & 1 \\ l_3 & m'_3 & n'_3 & 1 \\ 0 & 0 & 0 & 1 \end{bmatrix} \begin{bmatrix} \Delta x \\ \Delta y \\ 0 \\ c\Delta t \end{bmatrix} = \begin{bmatrix} \Delta l_1 \\ \Delta l_2 \\ \Delta l_3 \\ 0 \end{bmatrix} \quad (2)$$

Figure 24:
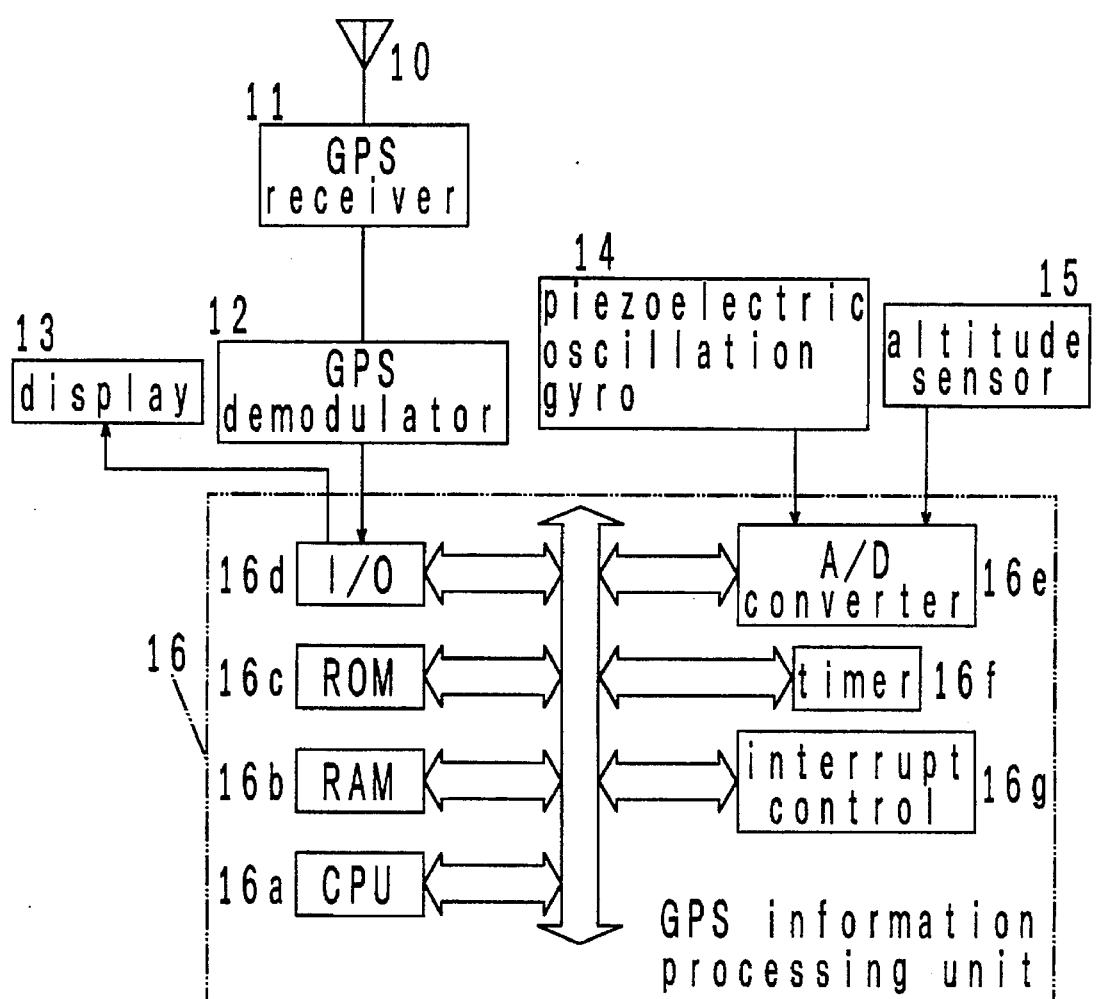
FIG. 24 is a block diagram of an overall system according to a second embodiment of the invention.

Referring to FIG. 24, there is shown the general arrangement of a system according to another embodiment of the invention. Referring to FIG. 24, it will be noted that except for the omission of a signal representing a tuning frequency, the arrangement is similar to that of FIG. 1. However, it should be understood that the operation of individual elements are different from that occurring in the arrangement of FIG. 1.

As mentioned previously, where radio waves from four GPS satellites can be simultaneously received, the position of a vehicle can be accurately determined through calculation which utilizes only information conveyed by the waves. However, where the number of available GPS satellites is insufficient, the calculation of the position of the vehicle is normally precluded. In order to enable the calculation of the position of the vehicle where the number of available GPS satellites is insufficient, there are provided a piezoelectric oscillation gyro 14 and an altitude sensor 15 in this embodiment, which feed signals to GPS information processing unit 16. The piezoelectric oscillation gyro 14 is fixedly mounted onboard and delivers an analog signal having a level which is proportional to the angular speed $\omega$ of rotation about an axis, which is a vertical axis of a vehicle. The altitude sensor 15 delivers an analog signal having a level which varies in accordance with a change in the atmospheric pressure or a change in the altitude.

GPS information processing unit 16 is a computer system including CPU (microprocessor) 16a, RAM 16b, ROM 16c, I/O port 16d, A/D converter 16e, timer 16f and interrupt control circuit 16g. Since signals which are delivered by the piezoelectric oscillation gyro 14 and the altitude sensor 15 are analog signals, they are input to CPU 16a through the converter 16e. GPS demodulator 12 delivers information as a digital signal, which is input to CPU 16a through I/O port 16d. Positional information including the latitude, the longitude and the altitude which is produced by CPU 16a is transferred to a display 13 through I/O port 16d.

Figure 25:
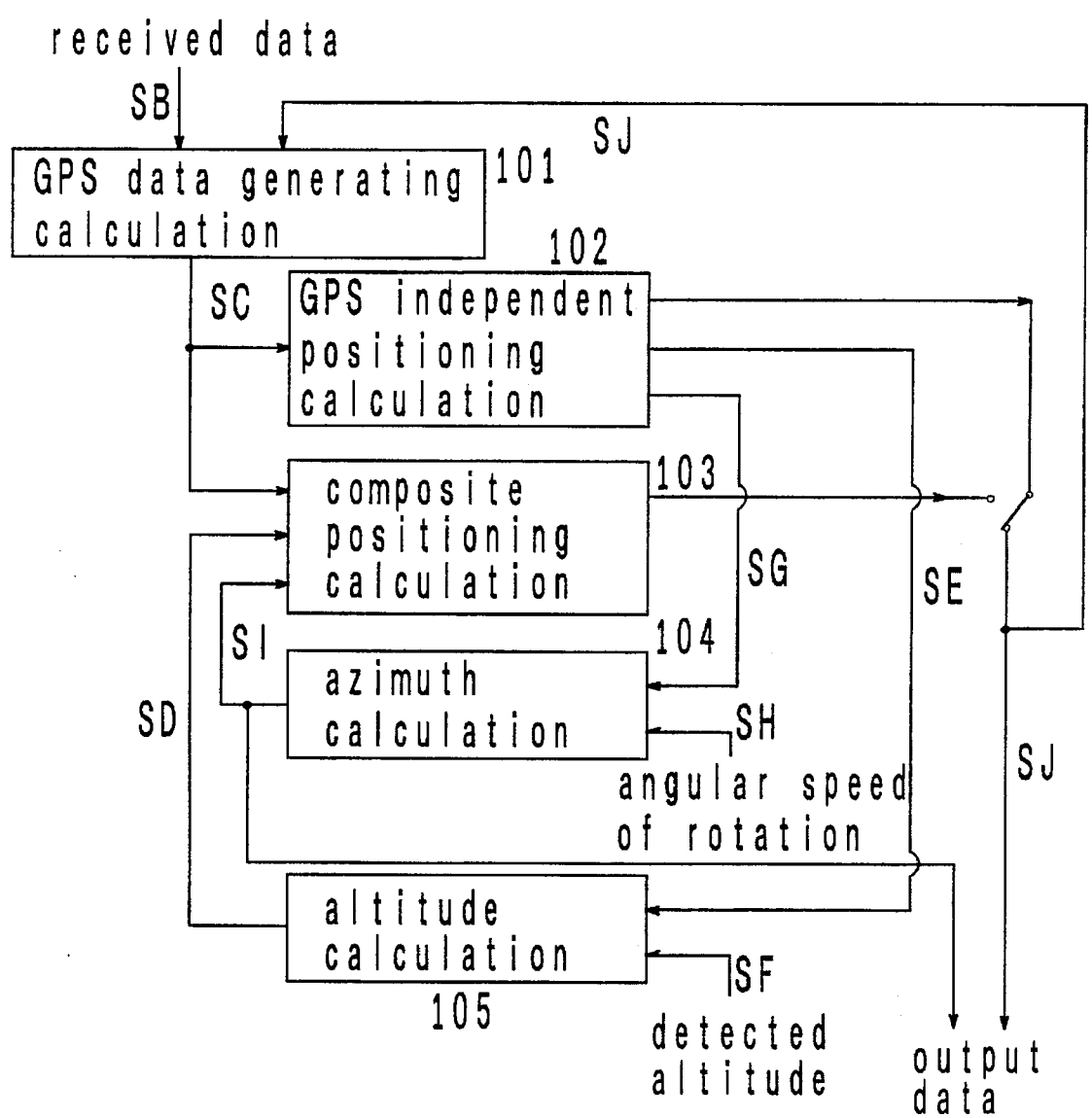
FIG. 25 is a block diagram showing a functional arrangement of a unit 16 shown in FIG. 24.

Functional arrangement of GPS information processing unit 16 is schematically shown in FIG. 25, illustrating the specific processing operation performed thereby. Referring to FIG. 25, received data SB which is output from GPS demodulator 12 comprises codes representing an orbital function, timing and accuracy of information of respective satellites, and are input to GPS data generating calculation 101 where data SC is generated from received data SB. Data SC is input to GPS independent positioning calculation 102 and composite positioning calculation 103. Whenever information from three or four GPS satellites can be simultaneously received, the execution of GPS independent positioning calculation 102 generates positional information SJ including the latitude, the longitude and the altitude, but where the number of available satellites is insufficient, the execution of composite positioning calculation 103 generates such positional information SJ. Positional information generated is transferred to the display 13 as output data. Positional information SJ is also fed back to the data generating calculation 101 is for its use during the calculation of the next pass.

In the composite positioning calculation 103, use is made of output data SI from an azimuth angle calculation 104 and an output data SD from an altitude calculation 105 in addition to data SC which is output from the GPS data generating calculation 101. In the azimuth angle calculation 104, an azimuth angle SI representing an orientation in which a vehicle proceeds is obtained on the basis of angular speed of rotation data SH which is produced by the piezoelectric oscillation gyro 14. In addition, in the azimuth angle calculation 104, the correction of the azimuth angle is executed by utilizing azimuth data SG which is obtained as a result of the GPS independent positioning calculation 102. In the altitude calculation 105, required altitude information SD is obtained from detected altitude data SF which is obtained by the altitude sensor 15 and altitude data SE which is obtained as a result of GPS independent positioning calculation 102.

Figure 26:
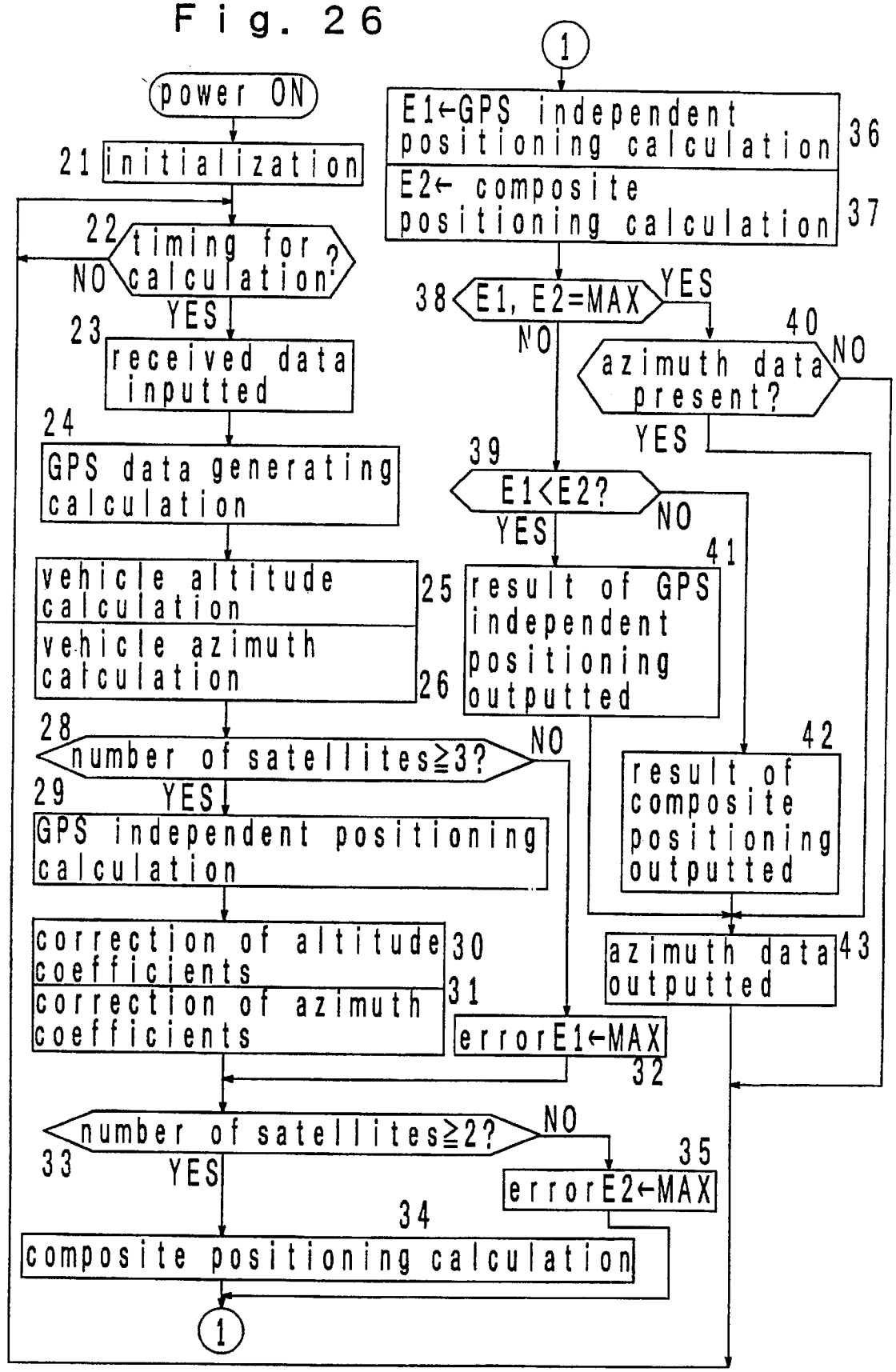
FIG. 26 is a flow chart illustrating the operation of CPU shown in FIG. 24.

The operation of CPU 16a of GPS information processing unit 16 is schematically shown in FIG. 26. Referring to FIG. 26, as the power supply is turned on, an initialization is executed at step 21. Thus, ports and memories are cleared, and various parameters are initialized. A mode for an interrupt operation and a timer mode are set up. Upon completion of step 21, the program proceeds from step 22 to step 23 at a given timing, for execution of subsequent processing operations.

At step 23, latest received data SB is input. At step 24, GPS data generating calculation (shown at 101 in FIG. 25) is executed upon received data SB. At next step 25, the prevailing altitude of the own vehicle is obtained, and the prevailing orientation (azimuth) in which the vehicle proceeds is obtained at step 26.

When signals from three or more satellites can be simultaneously received, the program proceeds from step 28 to step 29, and otherwise or when the number of available satellites is equal to two or less, the program proceeds from step 28 to step 32. At step 29, GPS independent positioning calculation (corresponding to 102 shown in FIG. 25) is executed. At next step 30, various parameters which are used when altitude (SD) is obtained at step 25 are corrected by utilizing a result of calculation performed at step 29. Various parameters which are used when obtaining azimuth angle (SI) at step 26 are corrected by utilizing a result of calculation performed at step 29. When the number of available satellites is equal to two or less, a maximum value is stored in an error register E1 at step 32.

At step 33, an examination is made to see if signals from two or more satellites can be received, and if such reception is possible, the program proceeds to step 34 where the composite positioning calculation (corresponding to 103 shown in FIG. 25) is executed. However, when there is no available satellite as when the vehicle is running through a tunnel, for example, the program proceeds to step 35 where a maximum value is stored in an error register E2.

At next step 36, an error which is detected upon execution of GPS independent positioning calculation at step 29 is stored in the register E1, and at next step 37, an error which is detected upon execution of the composite positioning calculation at step 34 is stored in the register E2. Subsequently, an examination is made to see whether or not a maximum value is stored in both registers E1 and E2, followed by either step 39 or 40 depending on the result of the examination. At step 39, the contents of the registers E1 and E2 are compared against each other, and if E1<E2, meaning that an error from the GPS independent positioning calculation is less than an error from the composite positioning calculation, the program proceeds to step 41 where the result of the GPS independent positioning calcuation (at step 29) or positional information SJ is delivered as an output. If it is found at step 39 that the inequality E1<E2 does not apply, the result of the composite positioning calculation (step 34) or positional information is delivered as output SJ. The output data SJ is fed back for its use in the calculation of the next pass.

At step 43, azimuth angle data (SI) which is obtained at step 26 is delivered to the display 13. When there is effective azimuth angle data even though there are no available satellite, the program proceeds from step 38 through step 40 to step 43 where the azimuth angle data is delivered to the display.

The described operation is executed repeatedly. In the present embodiment, positional information is calculated with a period of one second. However, the sampling of the output signal from the piezoelectric oscillation gyro and related calculation as well as the sampling of the output signal from the altitude sensor are repeatedly executed with a relatively short period through a timer interrupt operation. For example, the output signal from the piezoelectric oscillation gyro is sampled every 20 msec.

In this embodiment, GPS independent positioning calculation (step 29) is executed and the composite positioning calculation (step 34) is also executed even if three or more satellites are available. Normally, GPS independent positioning calculation is sufficient to provide an accurate position of the vehicle, but it is recognized that a large error occurs in the result of GPS independent positioning calculation where information transmitted from one of three GPS satellites, for example, has a low accuracy. Accordingly, by comparing errors contained in the two kinds of calculations against each other, and utilizing information with a lesser error, an increase in the error of detection is suppressed. The accuracy of information transmitted from GPS satellite can be known from accuracy code SVACC which is contained in the information being transmitted. However, when three or more satellites are available, the execution of the composite positioning calculation may be omitted.

Figure 27:
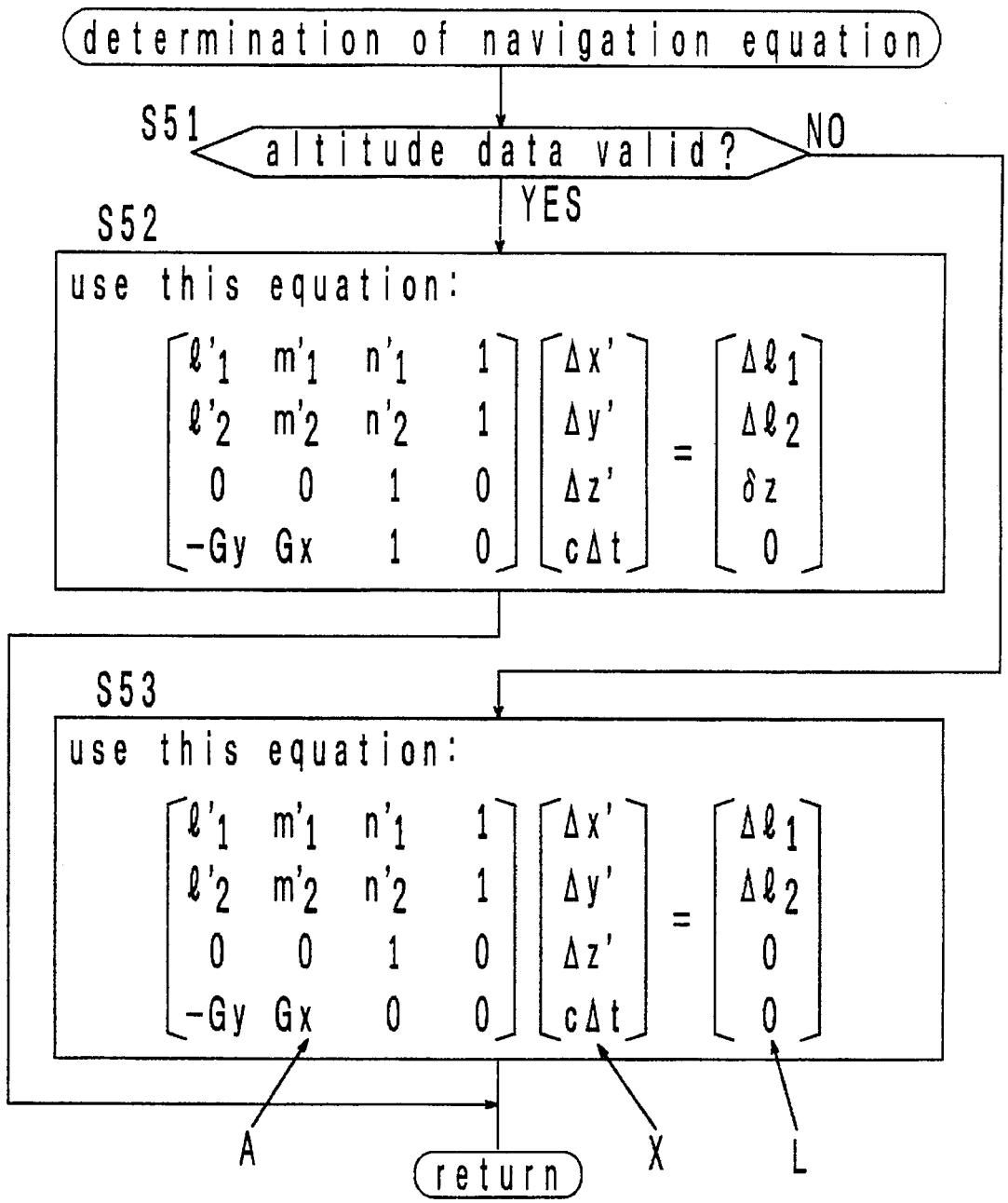
FIG. 27 is a flow chart showing a step S42 according to the second embodiment in detail.
Figure 29:
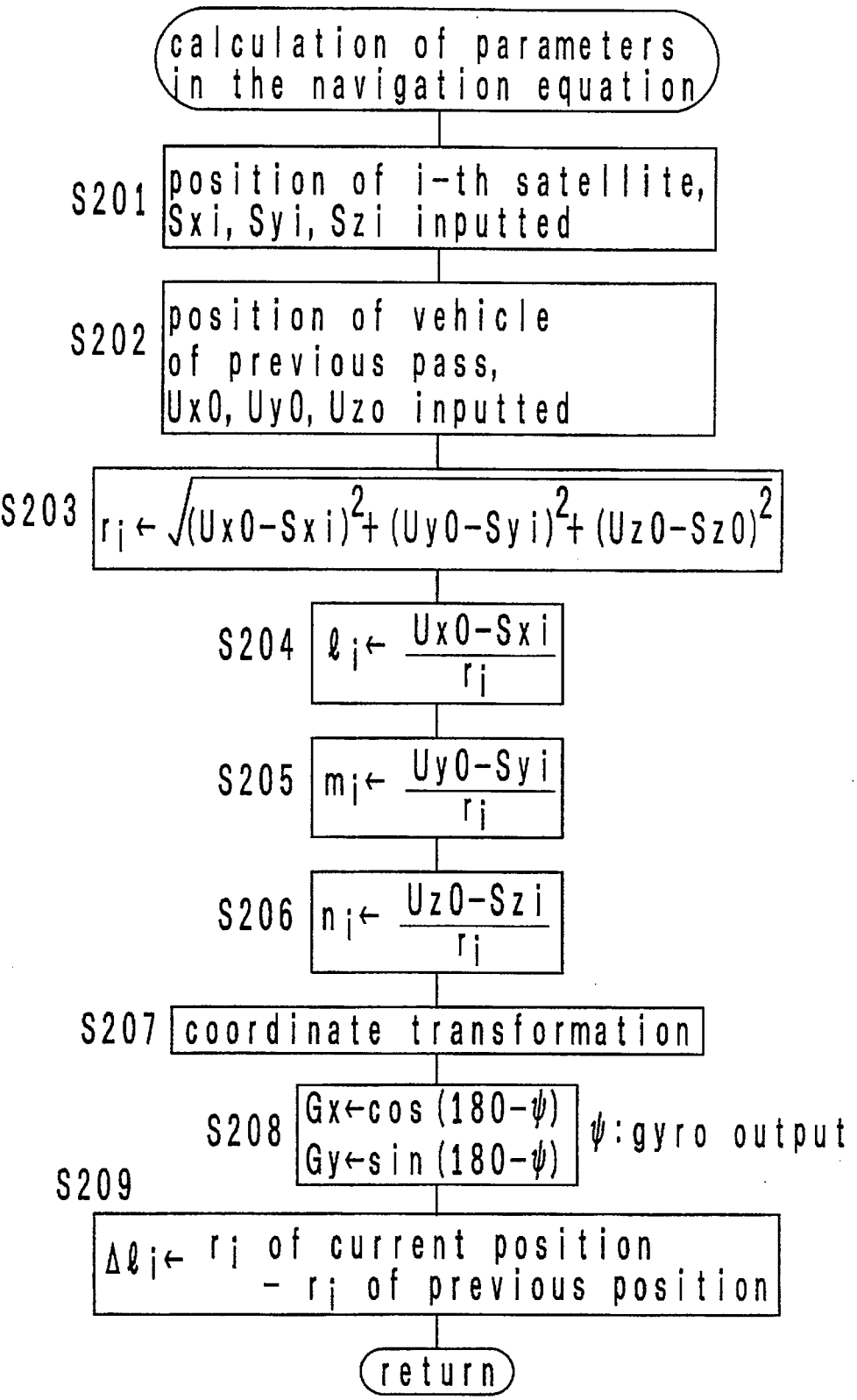
FIG. 29 is a flow chart showing the calculation of parameters used in a navigation equation according to the second embodiment in detail.

The detail of the composite positioning calculation (step 34) shown in FIG. 26 remains the same as that shown in FIG. 4, except that the "determination of navigation equation" (S42) is modified as indicated in FIG. 27 and that the "determination of measurement error estimation matrix" (S44) is modified as indicated in FIG. 28. In addition, the "calculation of parameters in the navigation equation" is modified as shown in FIG. 29. What has been described above will not be repeated here.

Parameters which are to be substituted into the individual matrices of the navigation equation are obtained by the execution of the processing operation shown in FIG. 29. Referring to FIG. 29, coordinates Sxi, Syi and Szi as referenced to an earth center coordinate system which is referenced to the center of the earth of the position of an i-th satellite is input at step S201. These values are obtained from the orbital function and timing transmitted from the satellite. At next step S202, coordinates Ux0, Uy0 and Uz0 as referenced to the earth center coordinate system indicating the position of the vehicle and which are obtained during the previous pass are input. These values are also obtained from the result of the calculation of the previous pass. At step S203, a distance ri from the position of the i-th satellite to the position of the own vehicle is calculated. At subsequent steps S204, S205 and S206, direction cosines $l_i$, $m_i$ and $n_i$ indicating the direction of the i-th satellite as viewed from the vehicle are determined as follows:

$$l_i=(Ux0-Sxi)/ri$$
$$m_i=(Uy0-Syi)/ri$$
$$n_i=(Uz0-Szi)/ri$$

Since direction cosines represented in the earth surface coordinate system are used in the navigation equation (see FIG. 27), a coordinate transformation is conducted at step S207, producing direction cosines $l'_i$, $m'_i$ and $n'_i$ in the earth surface system from the direction cosines $l_i$, $m_i$ and $n_i$ in the earth center system. The code transformation is specifically shown in FIG. 21.

At step S208, Gx and Gy are obtained from the azimuth angle φ which is obtained from the gyro output. At step S209, a change in the distance ri (which is referred to as equivalent range) from the position of the vehicle to the position of the i-th satellite which occurred from the previous pass to the current pass is calculated, and the result is denoted as $\Delta l_i$. Also a change in the altitude (δz) determined from the output of the altitude sensor 15 as occurring from the previous pass to the current pass is calculated.

As described above, even if the number of available satellites is equal to two or one, the position of the vehicle can be determined by compensating for any wanting information by means of the detection of the angular speed of rotation of the own vehicle through the gyro means, and the detection of the relative speed of the vehicle with respect to the satellite in accordance with the frequency of the signal transmitted from the satellite and the frequency of the signal which is actually received. In this manner, the need for a vehicle speed sensor is eliminated.

According to the second embodiment, even if the number of available satellites is equal to two, the gyro means is used to detect the angular speed of rotation of the vehicle and a change in the altitude is detected to compensate for any wanting information, again enabling the position of the vehicle to be determined. Again, the provision of a vehicle speed sensor is unnecessary.

As described in the above embodiments, a reference azimuth may be determined when three or more satellites are available and accordingly an accurate azimuth can be obtained by the independent positioning calculation. By calculating an azimuth on the basis of the reference azimuth and angular speed of rotation detected by the gyro means, the azimuth can be detected with a relatively good accuracy even when the number of available satellites is equal to two or less or when the accuracy of the azimuth is bad while utilizing three or more available satellites. By utilizing the result of the independent positioning calculation, the altitude detected by the altitude detecting means may be calibrated, thus providing an accurate altitude. In addition, by calculating an unknown variable using Kalman filter, a measurement error which occurs when the number of available satellites is equal to two or less can be prevented from increasing.

What is claimed is:

1. An onboard positioning system for determining the position of a vehicle based on information received onboard and relating to timing information and orbital information which are transmitted from each of a plurality of satellites comprising:

gyro means for delivering a signal in accordance with an angular speed of rotation of the vehicle;

altitude detecting means for delivering information representing the altitude of the position of the vehicle which is either detected or obtained by an estimation; and information processing means for determining a first equation and a second equation on the basis of each direction cosine of two satellites which are available at the same time, said each direction cosine representing an orientation of the available two satellites viewed from the vehicle and obtained from the information from the available two satellites, for determining a third equation on the basis of altitude information which is delivered by said altitude detecting means and for determining a fourth equation on the basis of only the angular speed of rotation of the vehicle which is delivered by the gyro means, and for calculating the position of the vehicle on the basis of said first, second, third and fourth equations in the event the number of simultaneously available satellites is two.

2. An onboard positioning system according to claim 1 in which the information processing means determines a reference azimuth representing an orientation in which the vehicle proceeds from an azimuth which is determined on the basis of satellite information obtained when the number of simultaneously available satellites is sufficient, and for determining the orientation in which the vehicle proceeds on the basis of the angular speed of rotation of the vehicle which is delivered from the gyro means and the reference azimuth when the number of available satellites is insufficient.

3. An onboard positioning system according to claim 1 in which the information processing means determines a reference azimuth representing an orientation in which the vehicle proceeds from an azimuth which is determined on the basis of satellite information obtained when the number of simultaneously available satellites is sufficient, sequentially updates the reference azimuth based on latest information from the satellite and inhibits the updating of the reference azimuth when the speed of the vehicle is or below a given value.

4. An onboard positioning system according to claim 1 in which the information processing means corrects altitude information from the altitude detecting means, by utilizing positional information determined from satellite information which is obtained when the number of simultaneously available satellites is sufficient.

5. An onboard positioning system according to claim 1 in which the information processing means calculates the position of the vehicle by obtaining a solution of a predetermined formula for Kalman filter in the event the number of simultaneously available satellites is insufficient.

6. An onboard positioning system according to claim 5 in which the information processing means determines a reference azimuth representing an orientation in which the vehicle proceeds from an azimuth determined on the basis of satellite information obtained when the number of simultaneously available satellites is sufficient and sequentially updates the reference azimuth on the basis of latest information from the satellite.

7. An onboard positioning system for determining the position of a vehicle based on information received onboard and relating to timing information and orbital information which are transmitted from each of a plurality of satellites, comprising:

gyro means for delivering a signal in accordance with an angular speed of rotation of the vehicle;

means for detecting relative speed of the vehicle with respect to each available satellite in accordance with a difference between the frequency of a signal transmitted from the satellite and the frequency of a signal which is actually received, the difference occurring by Doppler effect;

means for detecting direction of proceeding of the vehicle on the basis of angular speed of rotation of the vehicle which is delivered from the gyro means;

means for calculating a vehicle speed on the basis of said relative speed delivered from said means for detecting relative speed and said direction of proceeding of the vehicle delivered from said means for detecting direction of proceeding of the vehicle by calculating a speed vector V of the vehicle from a relative speed vector Vr, a satellite speed vector Vs, a direction cosine es and an azimuth vector eg which represents an orientation in which the vehicle proceeds; and information processing means for calculating the position of the vehicle on the basis of information from available satellites, the angular speed of rotation of the vehicle which is delivered from the gyro means, and said vehicle speed calculated from said means for calculating a vehicle speed in the event the number of simultaneously available satellites is insufficient.

8. An onboard positioning system according to claim 7 in which the information processing means determines a reference azimuth representing an orientation in which the vehicle proceeds based on an azimuth which is determined on the basis of satellite information obtained when the number of simultaneously available satellites is sufficient and for determining the orientation in which the vehicle proceeds on the basis of the angular speed of rotation of the vehicle which is delivered from the gyro means and the reference azimuth when the number of available satellites is insufficient.

9. An onboard positioning system according to claim 7 in which the information processing means calculates the position of the vehicle by obtaining a solution of a predetermined formula for Kalman filter when the number of simultaneously available satellites is insufficient.

10. An onboard positioning system according to claim 7 in which the means for calculating a vehicle speed calculates a vehicle speed on the basis of said relative speed detected by said means for detecting relative speed, a speed vector of the satellite obtained from the orbital information of the satellite, a direction cosine of the satellite representing an orientation of the satellite viewed from the vehicle obtained form the position of the satellite and the previous position of the vehicle, and said direction of proceeding of the vehicle delivered from said means for detecting direction of proceeding of the vehicle.

* * * * *